United States Patent
Chen et al.

(10) Patent No.: US 9,788,655 B2
(45) Date of Patent: Oct. 17, 2017

(54) SLIDE RAIL ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Hsiu-Chiang Liang, Kaohsiung (TW); Ci-Bin Huang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 15/146,896

(22) Filed: May 5, 2016

(65) Prior Publication Data
US 2017/0135481 A1    May 18, 2017

(30) Foreign Application Priority Data
Nov. 12, 2015 (TW) .............................. 104137450 A

(51) Int. Cl.
*A47B 88/10*    (2006.01)
*F16C 29/10*    (2006.01)
(Continued)

(52) U.S. Cl.
CPC .......... *A47B 88/10* (2013.01); *A47B 88/0477* (2013.01); *A47B 88/487* (2017.01);
(Continued)

(58) Field of Classification Search
CPC ...... F16C 29/004; F16C 29/008; F16C 29/04; F16C 29/10; F16C 2314/72; F16C 33/46;
(Continued)

(56) References Cited

U.S. PATENT DOCUMENTS 4,200,342 A * 4/1980 Fall ..................... A47B 88/493
312/334.9
4,445,726 A * 5/1984 Rock .................... F16C 33/306
384/19
(Continued)

FOREIGN PATENT DOCUMENTS

AT          511589 B1 * 1/2013 ........... A47B 88/493
CA       2890538 A1 * 5/2016 ............ F16C 29/005
(Continued)

*Primary Examiner* — Marcus Charles
(74) *Attorney, Agent, or Firm* — Winston Hsu

(57) ABSTRACT

A slide rail assembly includes a first rail; a second rail movable relative to the first rail; a third rail mounted between the first rail and the second rail; a first sliding auxiliary device movably arranged between the first rail and the third rail, the first sliding auxiliary device comprising at least one first rolling member and a first meshing feature, the least one first rolling member configured to facilitate the third rail to move relative to the first rail; a second sliding auxiliary device movably arranged between the third rail and the second rail, the second sliding auxiliary device comprising at least one second rolling member and a second meshing feature, the least one second rolling member configured to facilitate the second rail to move relative to the third rail; and a synchronizing member meshed between the first meshing feature and the second meshing feature.

19 Claims, 24 Drawing Sheets

(51) Int. Cl.
*A47B 88/04* (2006.01)
*F16C 29/04* (2006.01)
*F16C 29/00* (2006.01)
*A47B 88/487* (2017.01)

(52) U.S. Cl.
CPC ............ *F16C 29/008* (2013.01); *F16C 29/04* (2013.01); *F16C 29/10* (2013.01); *F16C 2314/72* (2013.01)

(58) Field of Classification Search
CPC ... A47B 88/0477; A47B 88/487; A47B 88/10; A47B 2210/007
USPC ...... 384/18–19, 21; 312/334.12, 334.21, 333
See application file for complete search history.

(56) References Cited

U.S. PATENT DOCUMENTS

| | | | | |
|---|---|---|---|---|
| 4,470,642 A * | 9/1984 | Gasperin | .............. | A47B 88/493 312/331 |
| 6,499,818 B2 * | 12/2002 | Brustle | ................ | A47B 88/467 312/319.1 |
| 6,945,620 B2 * | 9/2005 | Lam | ..................... | A47B 88/493 312/334.12 |
| 7,854,485 B2 * | 12/2010 | Berger | ................... | A47B 88/47 312/333 |
| 8,167,388 B2 * | 5/2012 | Hammerle | ........... | A47B 88/487 312/334.13 |
| 8,172,345 B2 | 5/2012 | Liang | | |
| 8,668,288 B2 | 3/2014 | Salice | | |
| 8,721,011 B2 | 5/2014 | Salice | | |
| 8,764,134 B2 | 7/2014 | Salice | | |
| 8,960,820 B2 * | 2/2015 | Chen | ...................... | A47B 88/04 312/331 |
| 8,960,821 B2 * | 2/2015 | Breisacher | ........... | A47B 88/493 312/331 |
| 9,211,007 B2 | 12/2015 | Brunnmayr | | |
| 9,215,929 B2 | 12/2015 | Brunnmayr | | |
| 2009/0033187 A1 * | 2/2009 | Chung | ................. | A47B 88/467 312/319.1 |
| 2009/0261698 A1 * | 10/2009 | Cabal Velarde | ..... | A47B 88/493 312/334.8 |
| 2009/0278430 A1 * | 11/2009 | Liang | ................... | A47B 88/467 312/319.1 |
| 2011/0050065 A1 * | 3/2011 | Lee | ..................... | E05B 17/0033 312/402 |
| 2011/0187254 A1 * | 8/2011 | Chen | ...................... | A47B 88/49 312/334.8 |
| 2013/0270987 A1 * | 10/2013 | Kelly | ................... | A47B 88/483 312/331 |
| 2014/0363107 A1 | 12/2014 | Egger | | |

FOREIGN PATENT DOCUMENTS

| | | | |
|---|---|---|---|
| CN | 104352095 A | 2/2015 | |
| DE | 20 2010 011 854 U1 | 1/2012 | |
| DE | 10 2011 002 212 A1 | 10/2012 | |
| DE | 20 2014 106 001 U1 | 4/2015 | |
| EP | 2594160 A2 * | 5/2013 | ............. A47B 88/40 |
| JP | 2010227190 A | 10/2010 | |
| JP | 3196235 U | 2/2015 | |

* cited by examiner

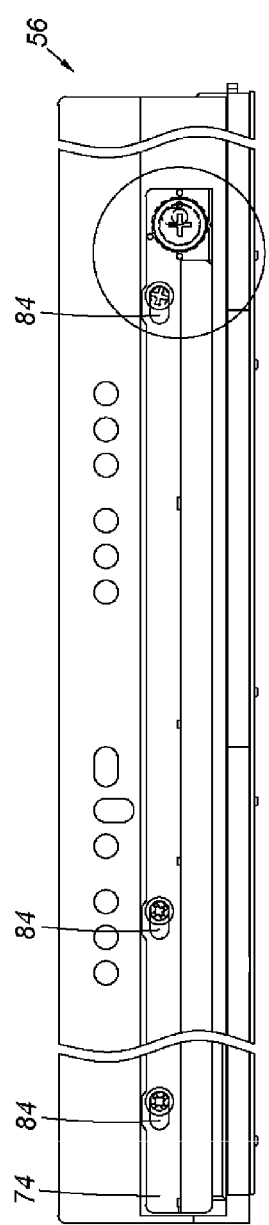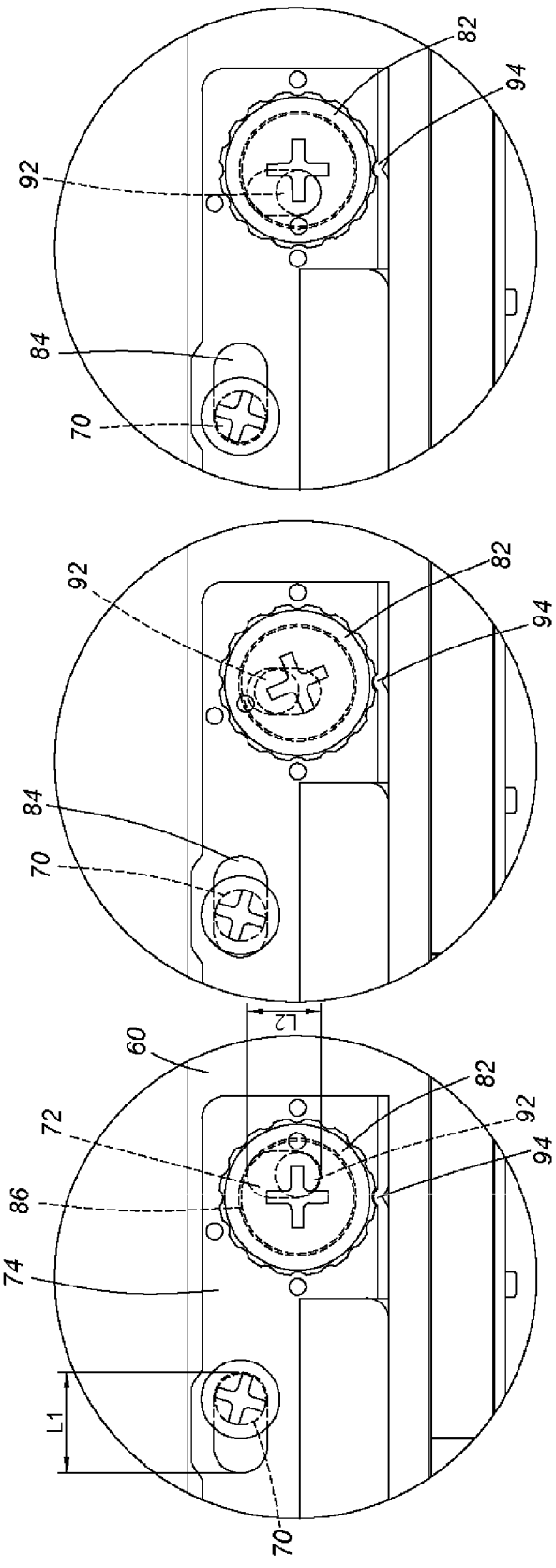

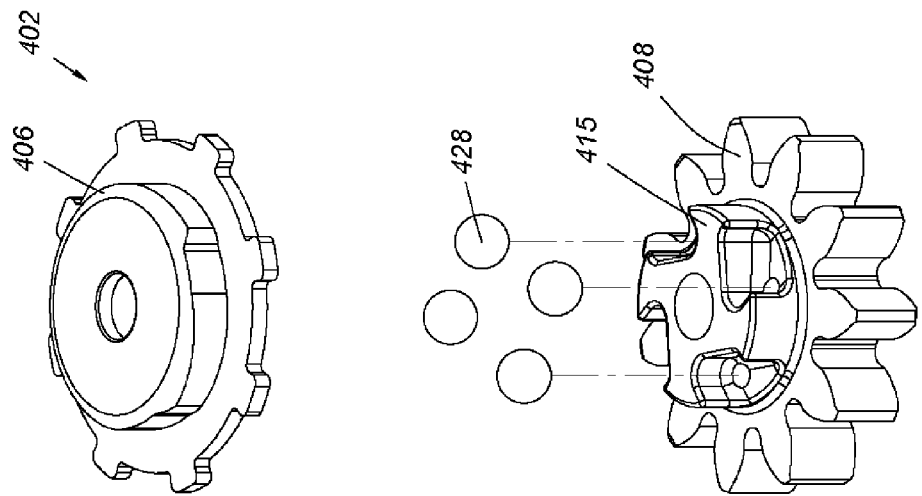

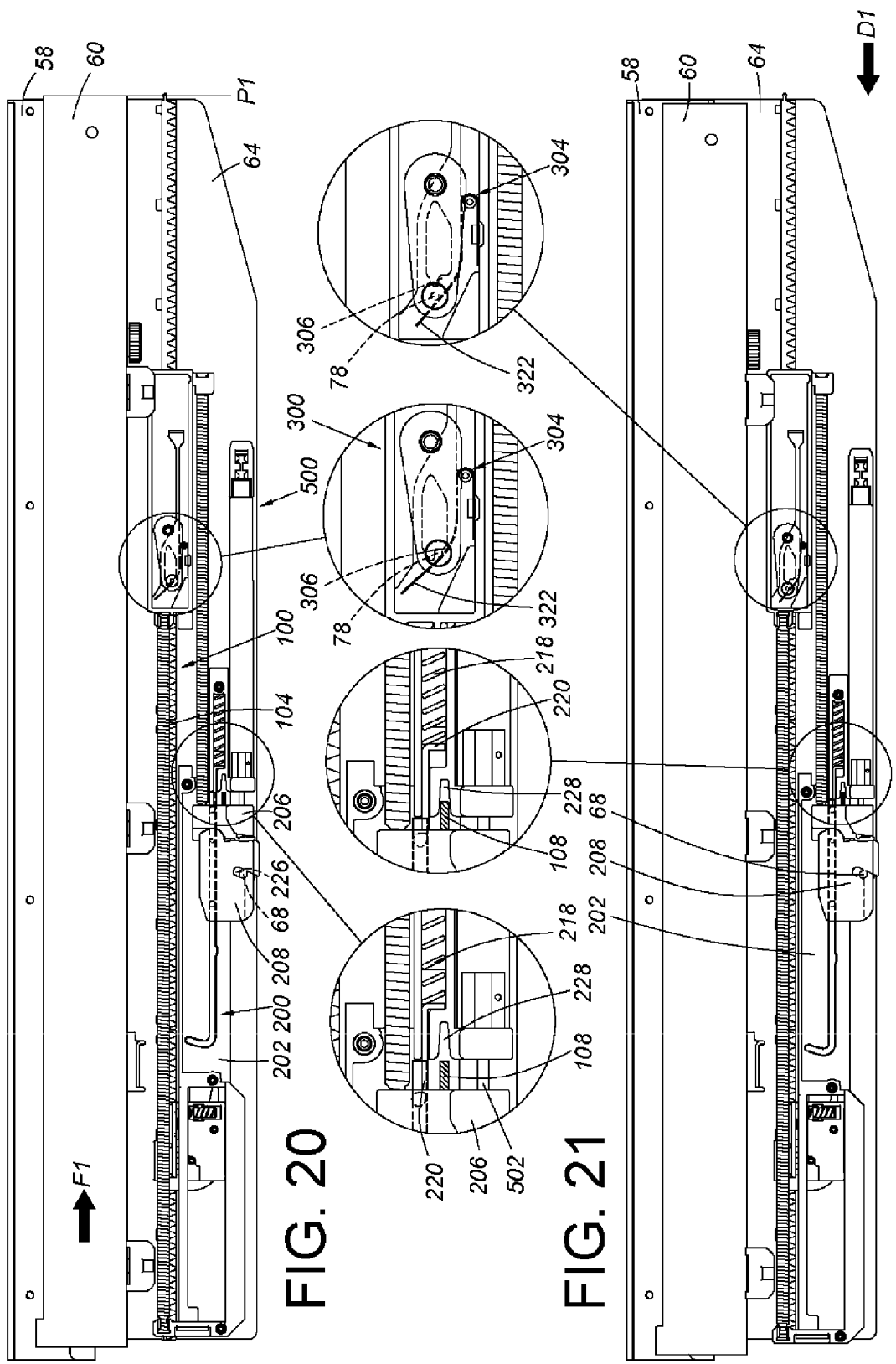

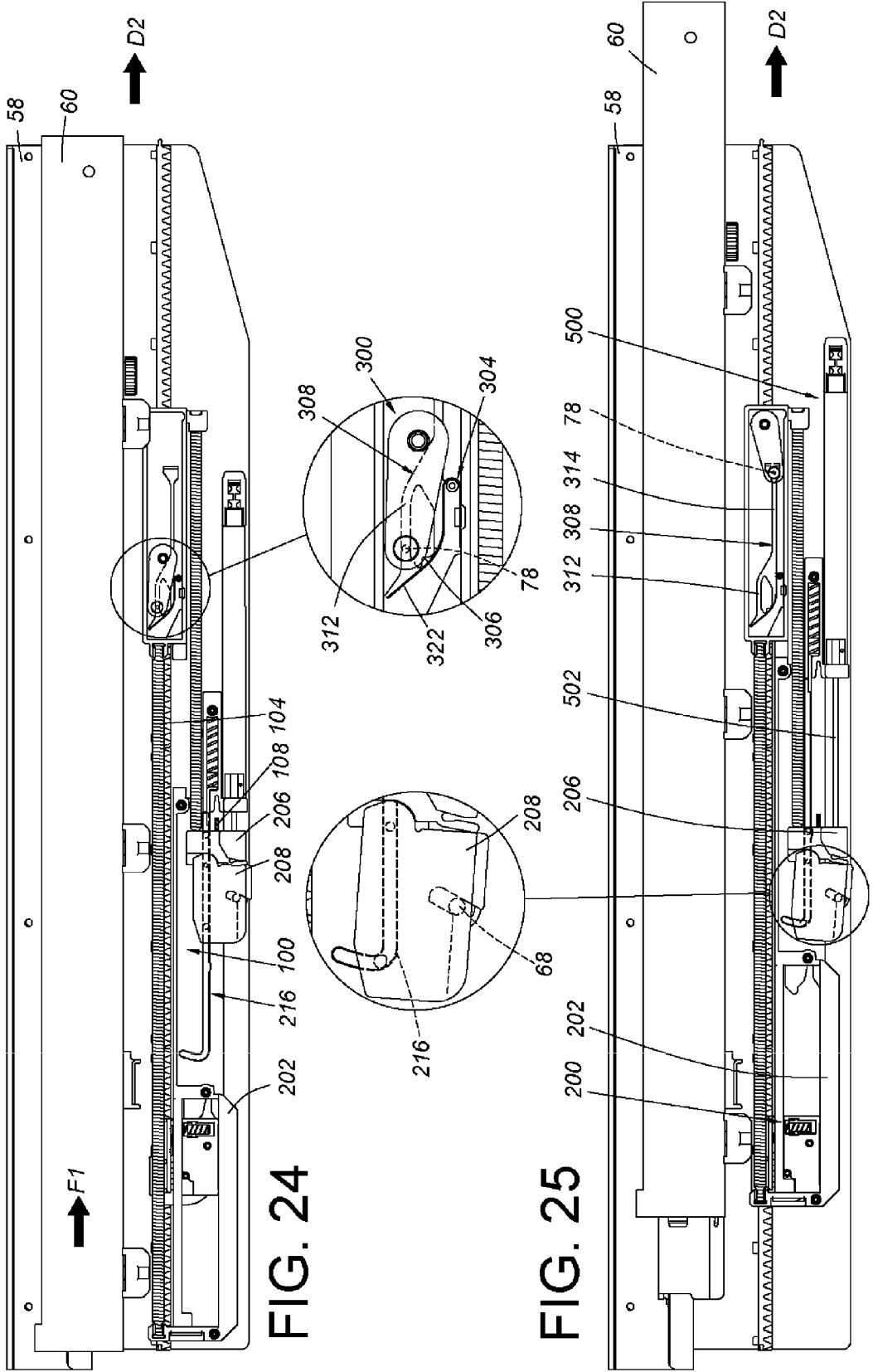

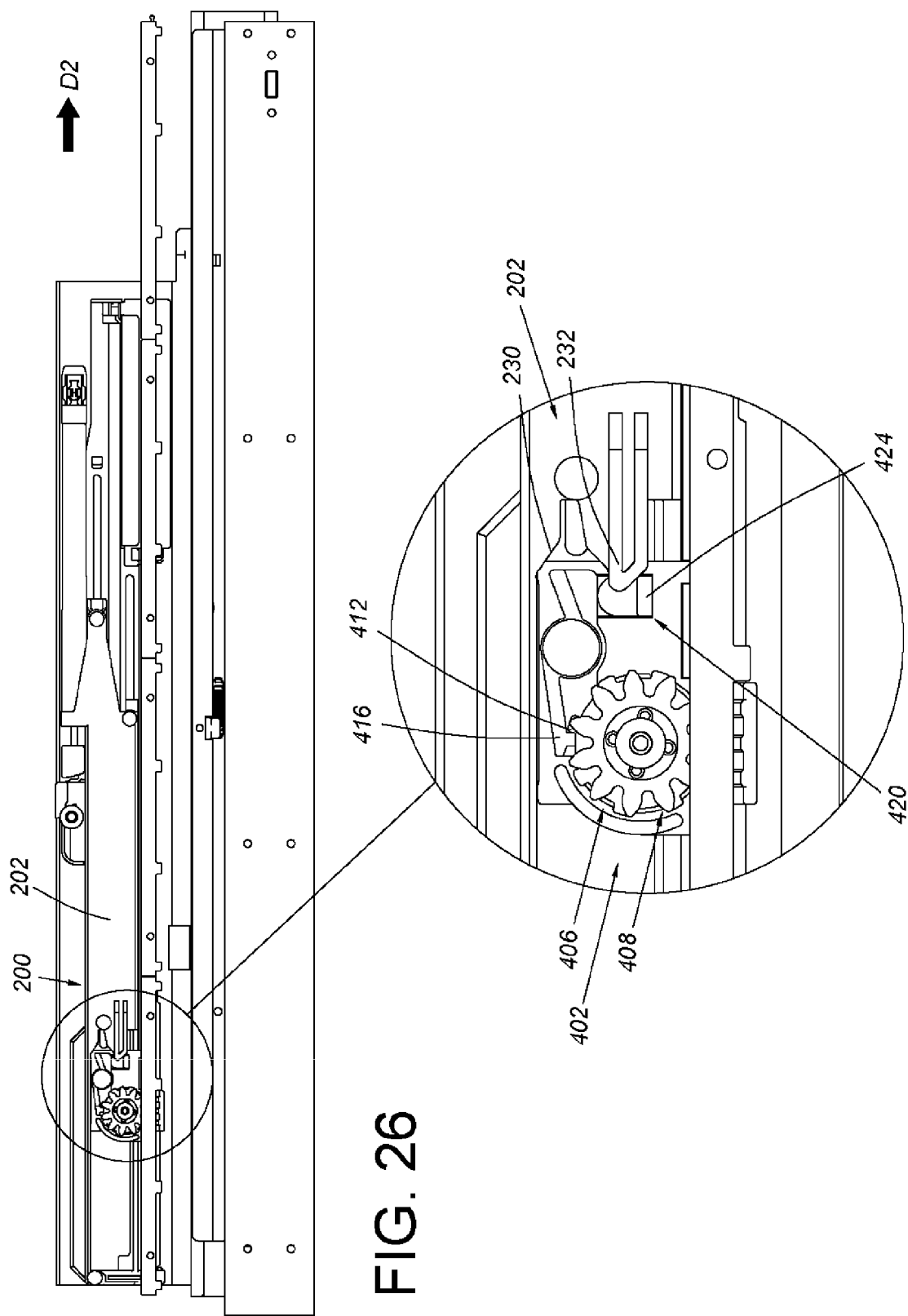

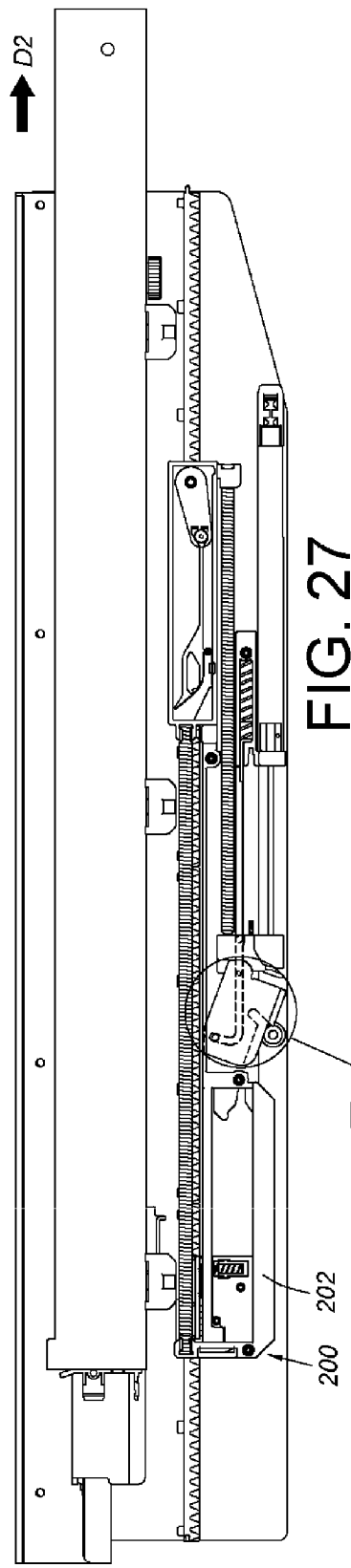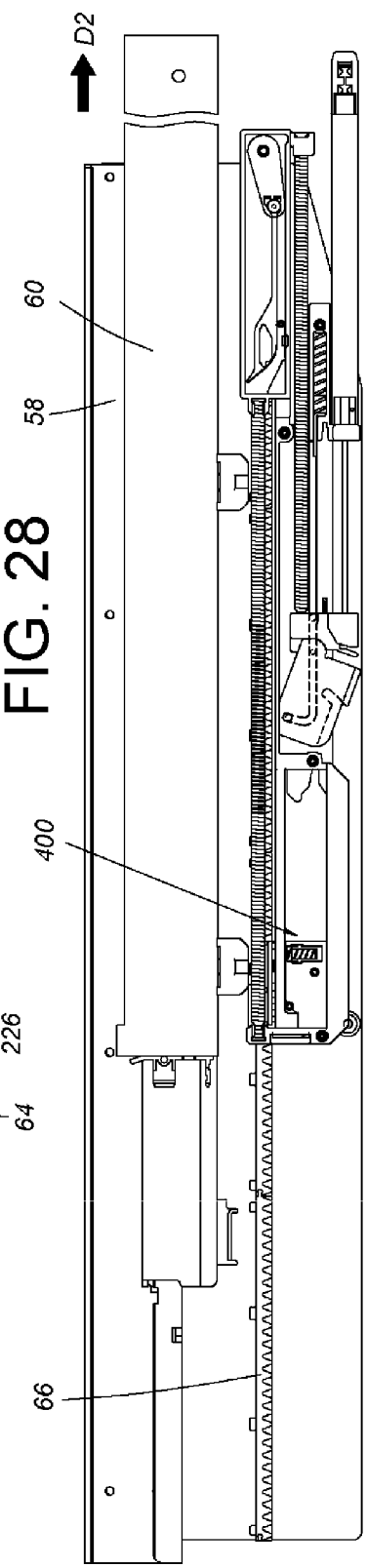

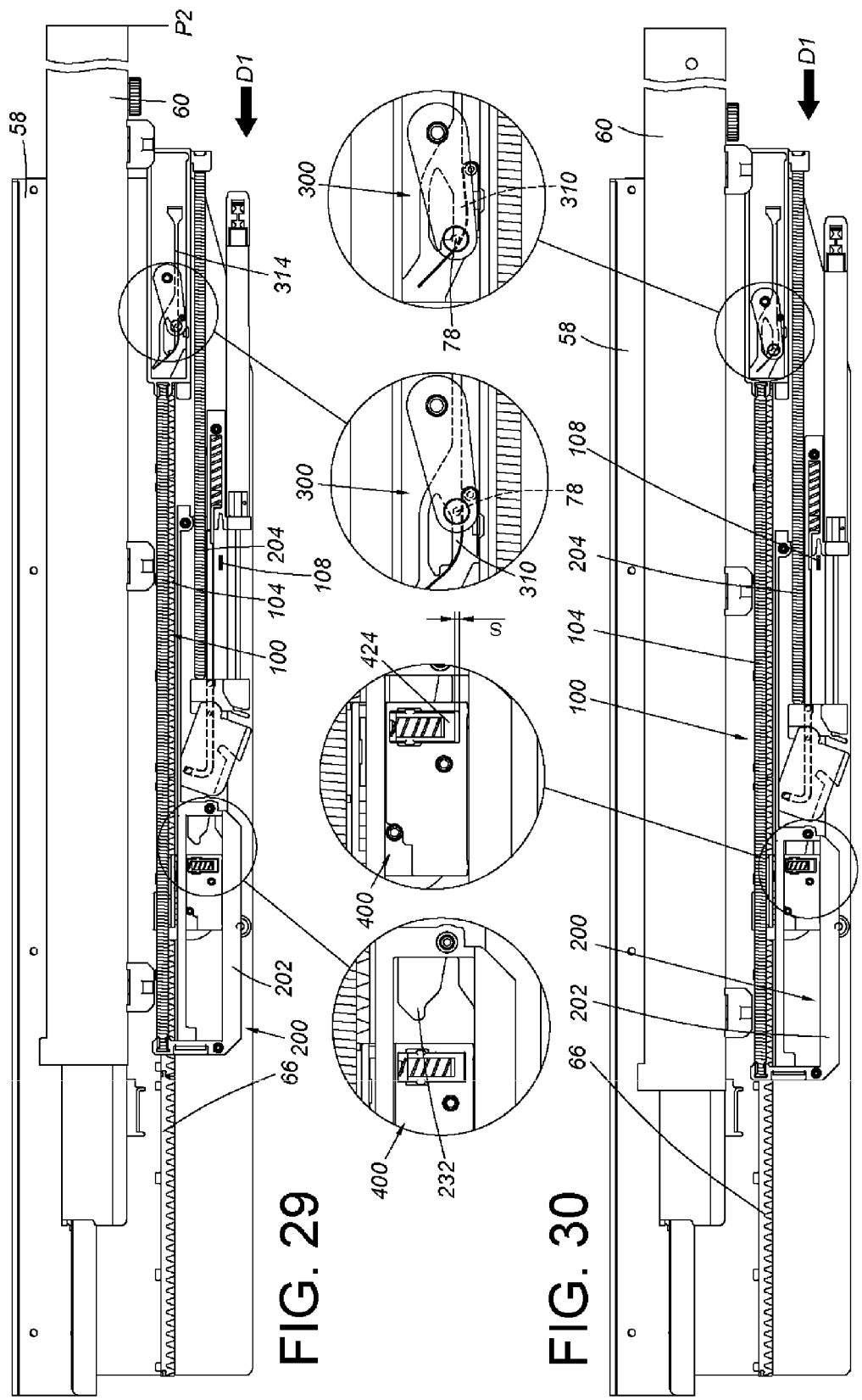

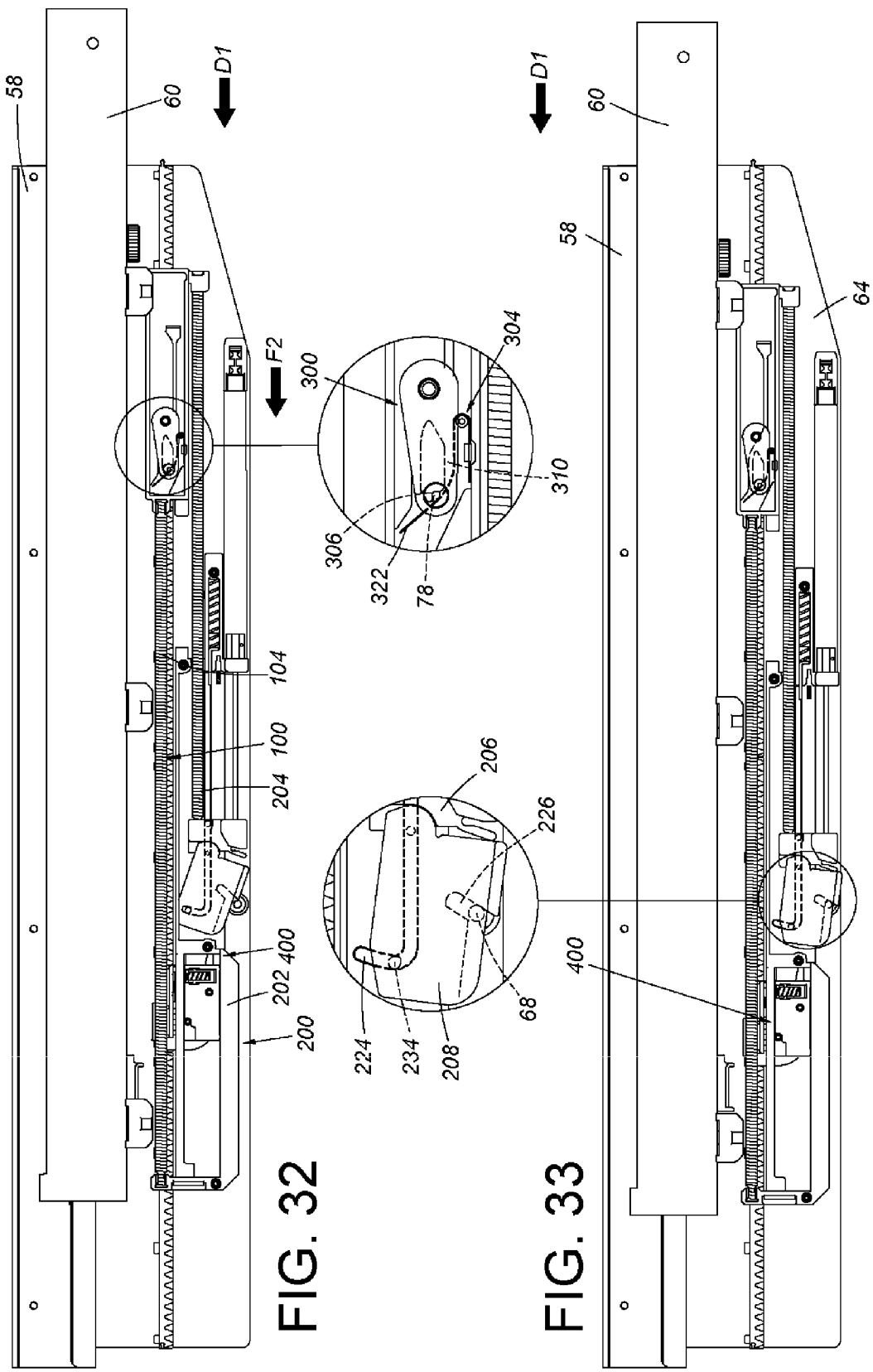

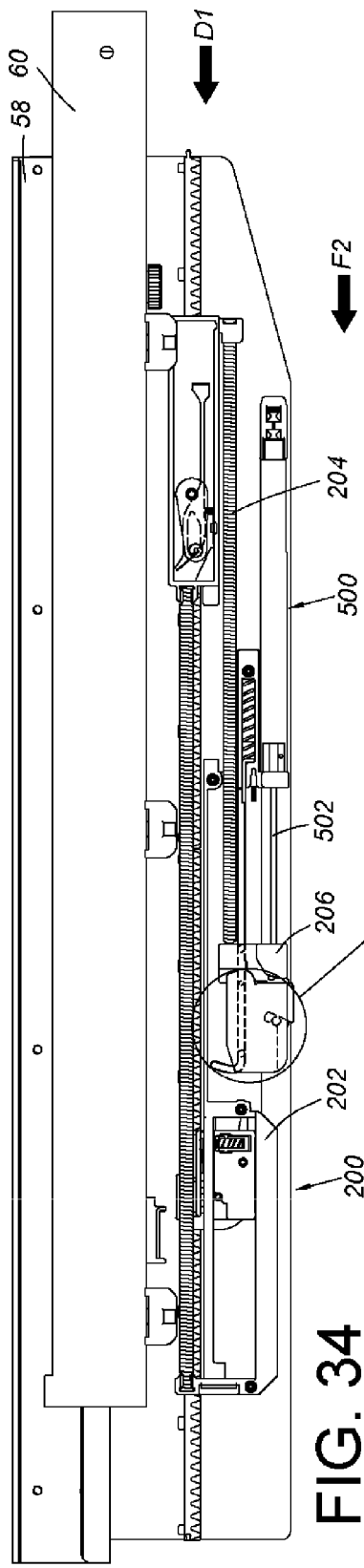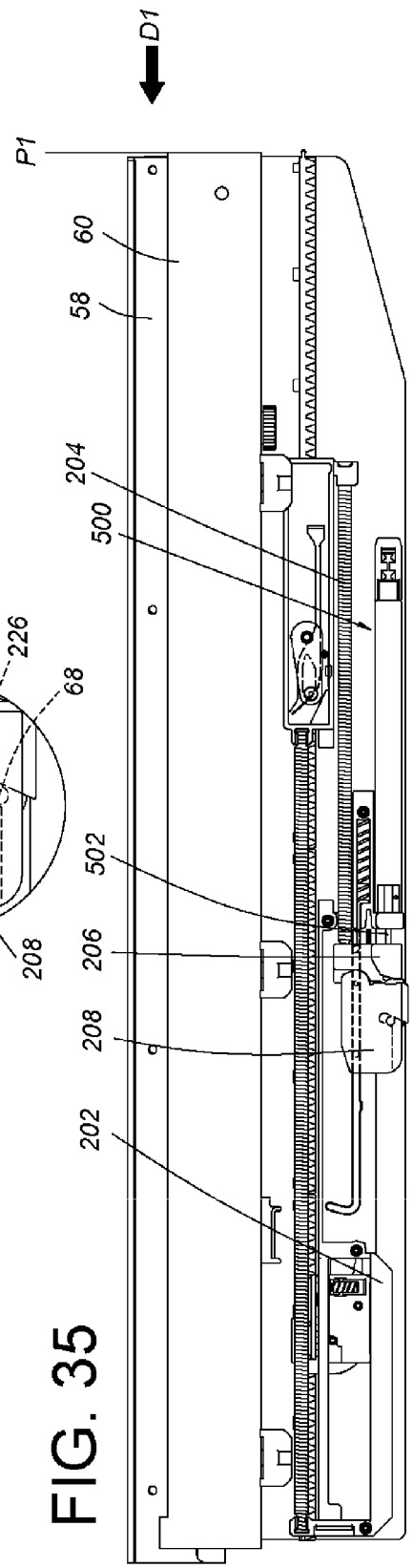

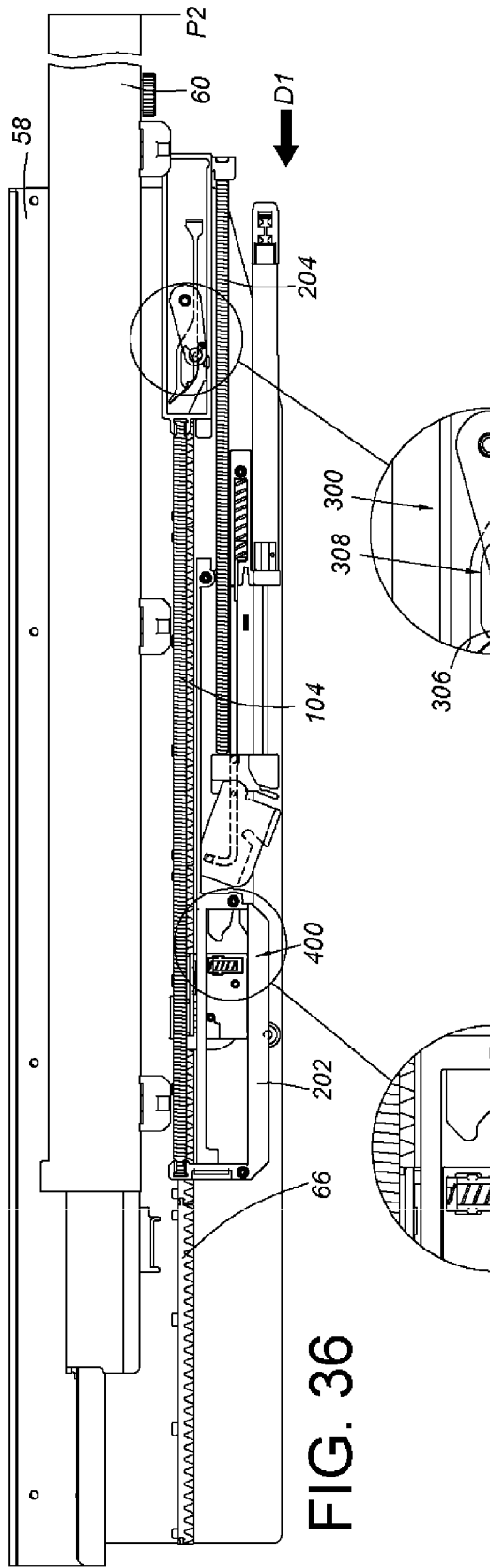
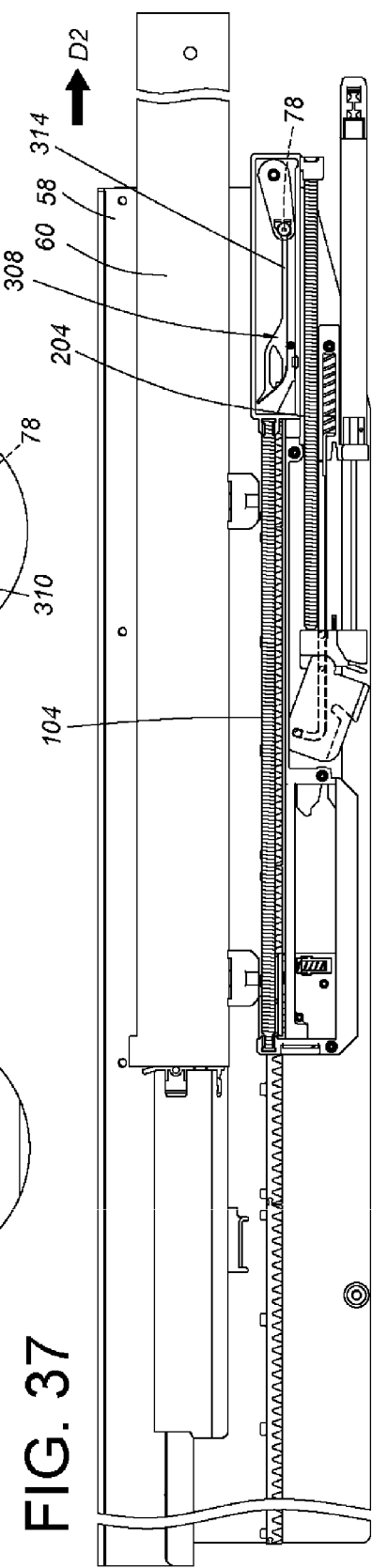
FIG. 36
FIG. 37

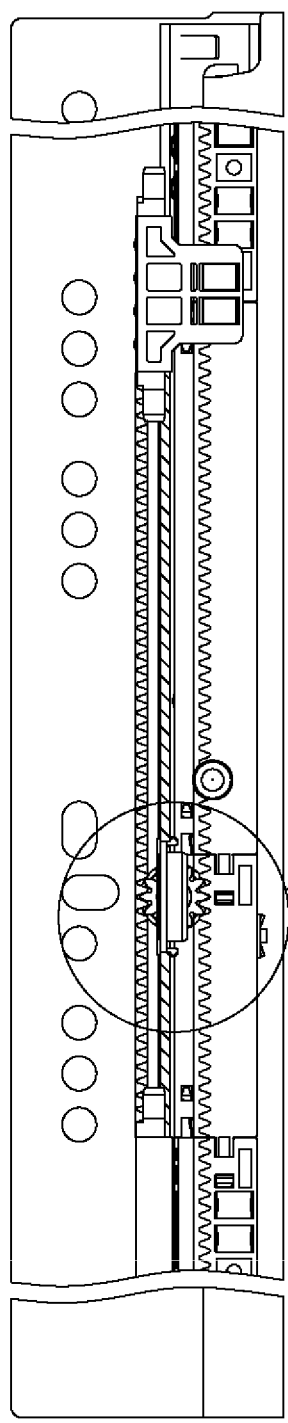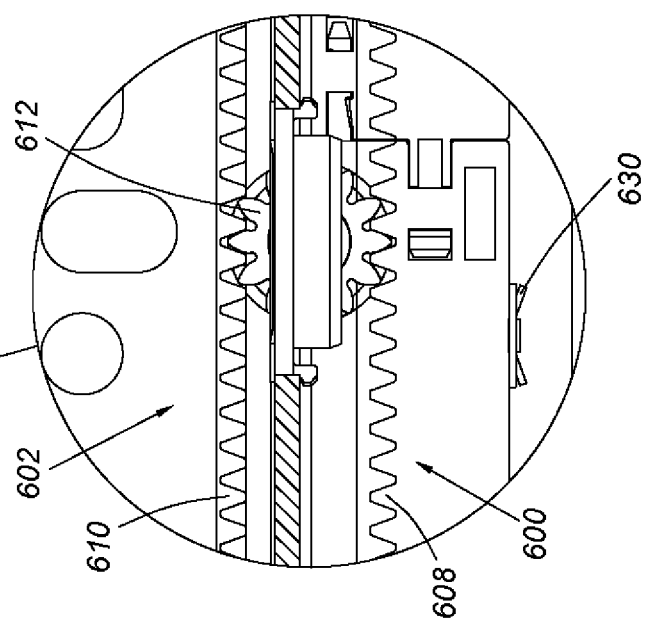
FIG. 41

SLIDE RAIL ASSEMBLY

BACKGROUND OF THE INVENTION

1. Field of the Invention

The present invention relates to a slide rail assembly, and more particularly, to a slide rail assembly for furniture.

2. Description of the Prior Art

In a furniture system, such as a drawer system, a drawer usually can be opened or closed relative to a cabinet through a pair of slide rail assemblies. In the prior art, an undermount drawer slide is important in product development. For example, U.S. Pat. No. 8,152,252 B2 and U.S. Pat. No. 8,231,189 B2 disclose related techniques for such products. The cases are provided for reference.

SUMMARY OF THE INVENTION

The present invention relates to a slide rail assembly comprising a synchronizing member for allowing two sliding auxiliary devices between rails to move synchronously relative to each other.

According to an embodiment of the present invention, a slide rail assembly comprises a first rail, a second rail, a third rail, a first sliding auxiliary device, a second sliding auxiliary device and a synchronizing member. The second rail is movable relative to the first rail. The third rail is mounted between the first rail and the second rail. The first sliding auxiliary device is movably arranged between the first rail and the third rail. The first sliding auxiliary device comprises at least one first rolling member and a first meshing feature. The least one first rolling member is configured to facilitate the third rail to move relative to the first rail. The second sliding auxiliary device is movably arranged between the third rail and the second rail. The second sliding auxiliary device comprises at least one second rolling member and a second meshing feature. The least one second rolling member is configured to facilitate the second rail to move relative to the third rail. The synchronizing member is meshed between the first meshing feature and the second meshing feature.

According to another embodiment of the present invention, a slide rail assembly comprises a first rail, a second rail, a third rail, a first sliding auxiliary device, a second sliding auxiliary device, a synchronizing member, a first driving device, a locking device, a swing member, a second driving device and a clutch device. The first rail comprises an engagement feature. The second rail is movable relative to the first rail. The third rail is mounted between the first rail and the second rail. The first sliding auxiliary device is movably arranged between the first rail and the third rail. The first sliding auxiliary device comprises at least one first rolling member and a first meshing feature. The least one first rolling member is configured to facilitate the third rail to move relative to the first rail. The second sliding auxiliary device is movably arranged between the third rail and the second rail. The second sliding auxiliary device comprises at least one second rolling member and a second meshing feature. The least one second rolling member is configured to facilitate the second rail to move relative to the third rail. The synchronizing member is meshed between the first meshing feature and the second meshing feature. The first driving device comprises a first base and a first elastic member. The locking device is connected to the first base of the first driving device, and the locking device comprises a locking part. The swing member is movably connected to the second rail, wherein the first elastic member of the first driving device is configured to accumulate a first driving force in response to the swing member abutting against the locking part of the locking device, and the first driving force is configured to drive the second furniture part to move from a retrieve position to an open position relative to the first furniture part. The second driving device is mounted to the second rail, and the second driving device comprises a second base, a capturing member and a second elastic member, wherein the capturing member is movably connected to the second base for capturing the engagement feature of the first rail. The clutch device is mounted between the first rail and the first base of the first driving device. Wherein, the clutch device is configured to block the first driving device along a predetermined direction, when the second rail is moved from the open position to the retrieve position, the swing member abuts against the locking part of the locking device and the second elastic member accumulates a second driving force. The second driving force is configured to drive the second rail to be retrieved relative to the first furniture part.

According to another embodiment of the present invention, a slide rail assembly comprises a first rail, a second rail, a third rail, a first sliding auxiliary device, a second sliding auxiliary device, a synchronizing member, a first driving device, a locking device, and a swing member. The second rail is movable relative to the first rail. The third rail is mounted between the first rail and the second rail. The first sliding auxiliary device is movably arranged between the first rail and the third rail, and the first sliding auxiliary device comprises at least one first rolling member and a first meshing feature. The least one first rolling member is configured to facilitate the third rail to move relative to the first rail. The second sliding auxiliary device is movably arranged between the third rail and the second rail, and the second sliding auxiliary device comprises at least one second rolling member and a second meshing feature. The least one second rolling member is configured to facilitate the second rail to move relative to the third rail. The synchronizing member is meshed between the first meshing feature and the second meshing feature. The first driving device comprises a first elastic member. The locking device is connected to the first driving device, and the locking device comprises a locking part, a guiding passage passing through the locking part, and a guiding member configured to generate a force toward the locking part. The swing member is movably connected to the second rail, and configured to move to abut against the locking part through the guiding passage. Wherein, the first elastic member of the first driving device is configured to accumulate a first driving force in response to the swing member abutting against the locking part; and when the swing member is disengaged from the locking part, the swing member is guided to the guiding passage by the guiding member of the locking device, and the first elastic member releases the first driving force to drive the second rail to move from a retrieve position to an open position relative to the first rail.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a side view of the slide rail assembly according to an embodiment of the present invention.

FIGS. 6-8 are diagrams showing operation of an adjusting member for longitudinally adjusting a carrying member relative to a rail according to an embodiment of the present invention.

FIG. 13 is a diagram showing a control member of the clutch device engaging with a component of a clutch.

FIG. 14 is a diagram showing an opposite side of FIG. 13.

FIG. 15 is an exploded view of the clutch of the clutch device according to an embodiment of the present invention.

FIG. 20 is a diagram showing a second rail of the slide rail assembly located at a retrieve position relative to a first rail, and a first elastic member of the first driving device accumulating a first driving force due to the swing member abutting against a locking part according to an embodiment of the present invention.

FIG. 21 is a diagram showing the second rail of the slide rail assembly being pushed to move along a first direction relative to the first rail according to an embodiment of the present invention.

FIG. 24 is a diagram showing the swing member of the slide rail assembly being disengaged from the locking part of the locking device, and the first elastic member releasing an elastic force to drive the second rail to move along a second direction relative to the first rail according to an embodiment of the present invention.

FIG. 25 is a diagram showing the first elastic member further releasing the elastic force to continue driving the second rail to move along the second direction relative to the first rail.

FIG. 26 is a diagram showing a status of the clutch device when the second rail of the slide rail assembly is moved along the second direction relative to the first rail according to an embodiment of the present invention.

FIG. 27 is a diagram showing the first elastic member of the first driving device of the slide rail assembly releasing the elastic force to drive the second rail to further move along the second direction relative to the first rail according to an embodiment of the present invention, wherein a capturing member is deflected to disengage from an engagement feature.

FIG. 28 is a diagram showing the second rail of the slide rail assembly of FIG. 27 being further moved along the second direction relative to the first rail.

FIG. 29 is a diagram showing the second rail of the slide rail assembly being retrieved from an open position along the first direction relative to the first rail according to an embodiment of the present invention.

FIG. 30 is a diagram showing the second rail of the slide rail assembly of FIG. 29 being further retrieved along the first direction relative to the first rail, wherein the clutch device blocks the first driving device to stretch the first elastic member and the second elastic member for accumulating elastic forces.

FIG. 32 is a diagram showing the second rail of the slide rail assembly being further retrieved along the first direction relative to the first rail according to an embodiment of the present invention, for illustrating a status of the swing member abutting against the locking part.

FIG. 33 is a diagram showing the second rail of the slide rail assembly of FIG. 32 being continuously retrieved along the first direction relative to the first rail.

FIG. 34 is a diagram showing the second rail of the slide rail assembly being further retrieved along the first direction relative to the first rail according to an embodiment of the present invention, wherein the capturing member captures the engagement feature of the first rail for allowing the second elastic member to release a second driving force.

FIG. 35 is a diagram showing the second elastic member of FIG. 34 releasing the second driving force to drive the second rail to be retrieved along the first direction relative to the first rail.

FIG. 36 is a diagram showing the second rail of the slide rail assembly being retrieved from the open position along the first direction relative to the first rail according to an embodiment of the present invention.

FIG. 37 is a diagram showing elastic forces of the first elastic member and the second elastic member ejecting the second rail along the second direction when an external force applied to the second rail along the first direction is not big enough to overcome the elastic forces of the first elastic member and the second elastic member.

FIG. 41 is a side view of the slide rail assembly comprising the synchronizing member arranged between the two sliding auxiliary devices.

DETAILED DESCRIPTION

Figure 1:
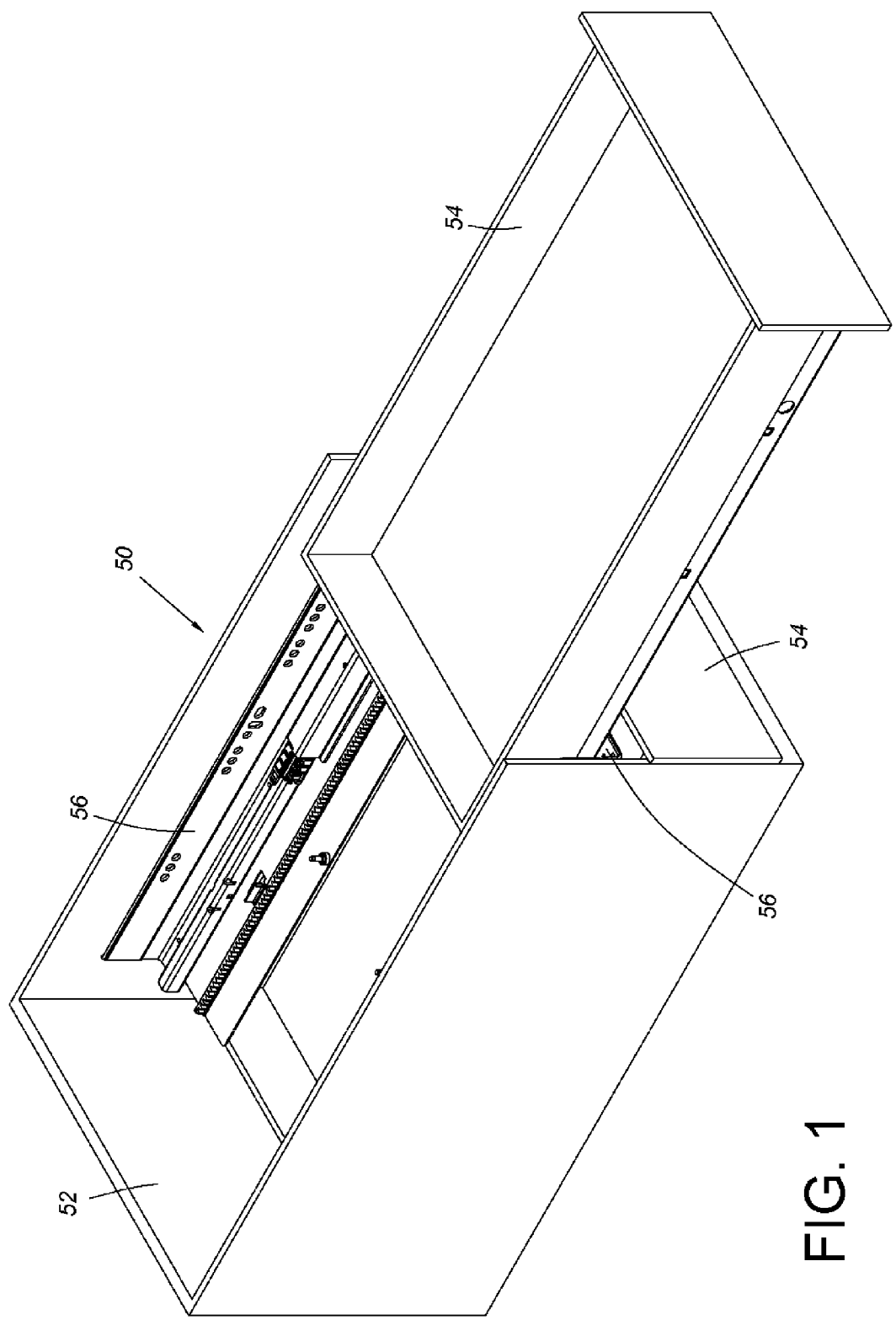
FIG. 1 is a diagram showing a drawer being opened relative to a cabinet according to an embodiment of the present invention.

FIG. 1 shows a system. 50 comprising a first furniture part 52, at least one second furniture part 54 and a pair of slide rail assemblies 56 according to an embodiment of the present invention. The system 50 can be furniture or a cabinet. The system 50 can be a furniture system or a rack system. In the present embodiment, the first furniture part is a cabinet for example, and the second furniture part is a drawer for example. The pair of the slide rail assemblies 56 is mounted between the first furniture part 52 and the second furniture part 54. In the present embodiment, the slide rail assemblies 56 are undermount drawer slides, and are respectively mounted to the second furniture part 54 to be adjacent to two sides of a bottom of the second furniture part 54. According to the above arrangement, the second furniture part 54 can be easily opened or closed relative to the first furniture part 52 through the pair of slide rail assemblies 56.

Figure 2:
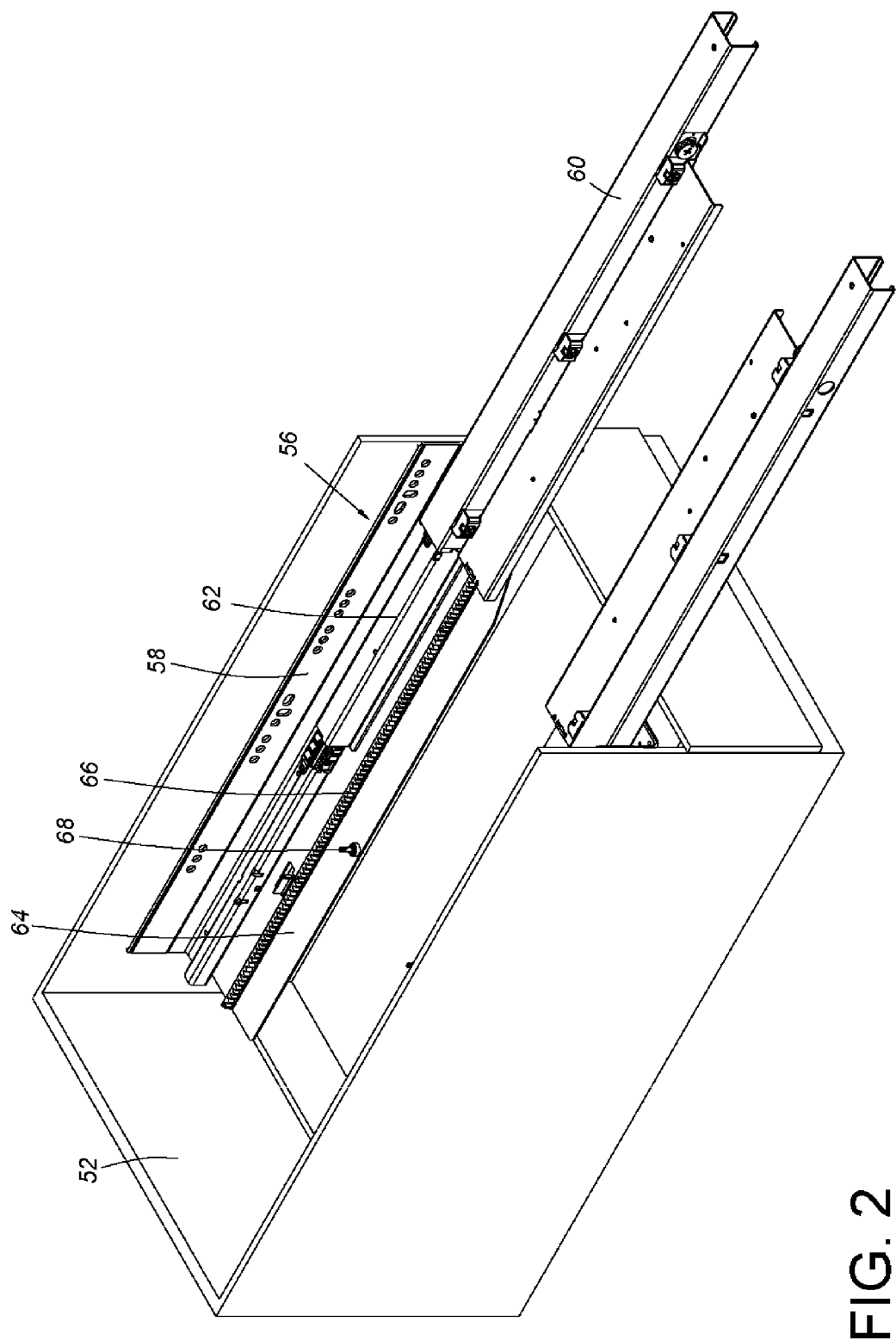
FIG. 2 is diagram showing the cabinet of FIG. 1 with the drawer being removed.

As shown in FIG. 2, the slide rail assembly 56 comprises a first rail 58 and a second rail 60. The first rail 58 is longitudinally and fixedly mounted to the first furniture part 52. As such, the first rail 58 can be seen as a portion of the first furniture part 52. The second rail 60 is longitudinally movable relative to the first rail 58. As such, the second rail 60 can be seen as a portion of the second furniture part 54. Preferably, the slide rail assembly 56 further comprises a third rail 62 movably mounted between the first rail 58 and the second rail 60. The third rail 62 is configured to extend a traveling distance of the second rail 60 relative to the first rail 58. Preferably, the slide rail assembly 56 further comprises an extension base 64 fixedly attached to the first rail 58. The extension base 64 can be seen as a portion of the first rail 58, and the extension base 64 is arranged along a longitudinal direction of the first rail 58. Preferably, the slide rail assembly 56 further comprises an auxiliary track 66 arranged along a longitudinal direction of the extension base 64. In the present embodiment, the auxiliary track is a gear rack. The extension base 64 further comprises an engagement feature 68. The engagement feature 68 can be an independent component fixedly attached on the extension base 64, or the engagement feature 68 can be formed from the extension base 64.

Figure 3:
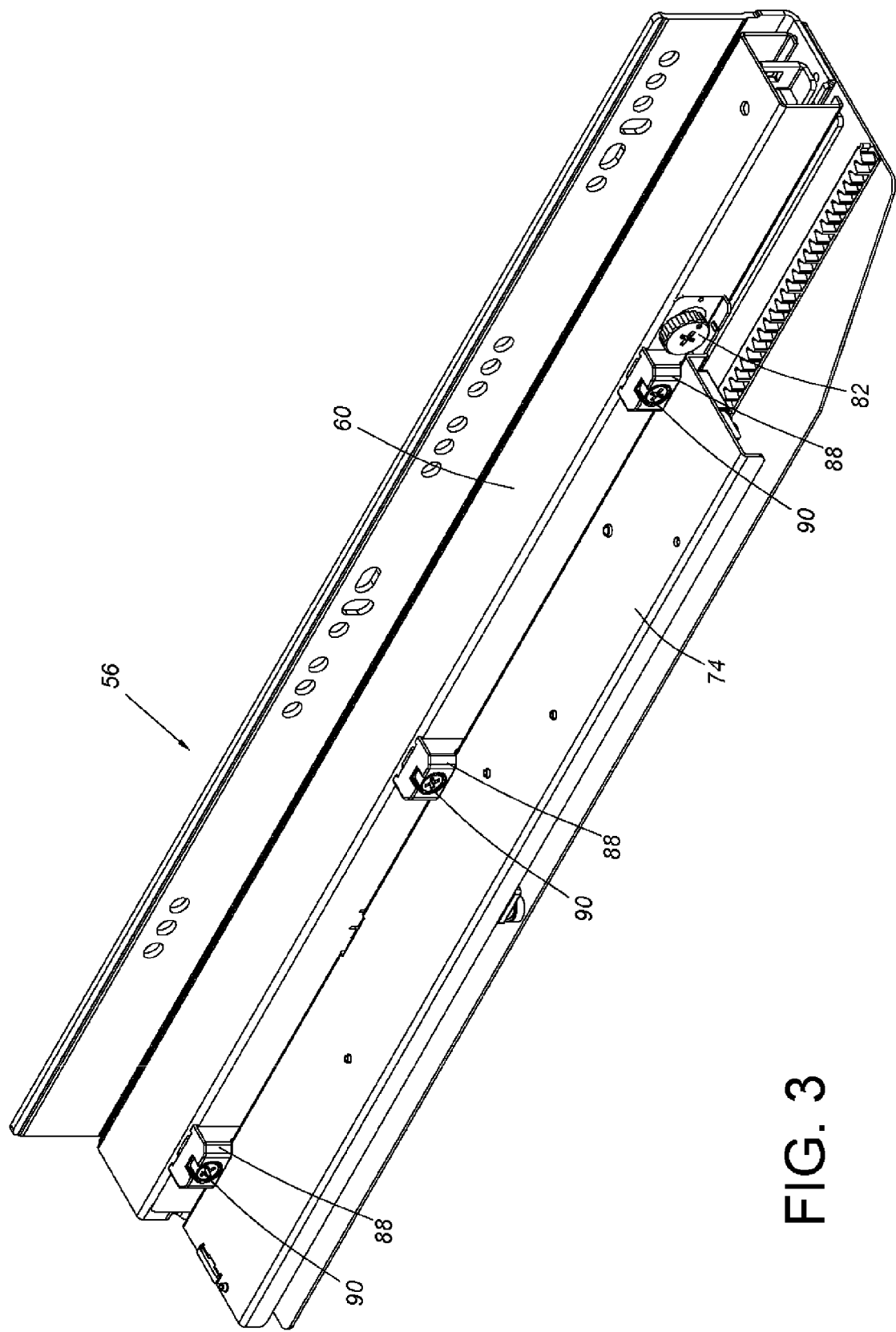
FIG. 3 is diagram showing a slide rail assembly in a retrieve status according to an embodiment of the present invention.
Figure 4:
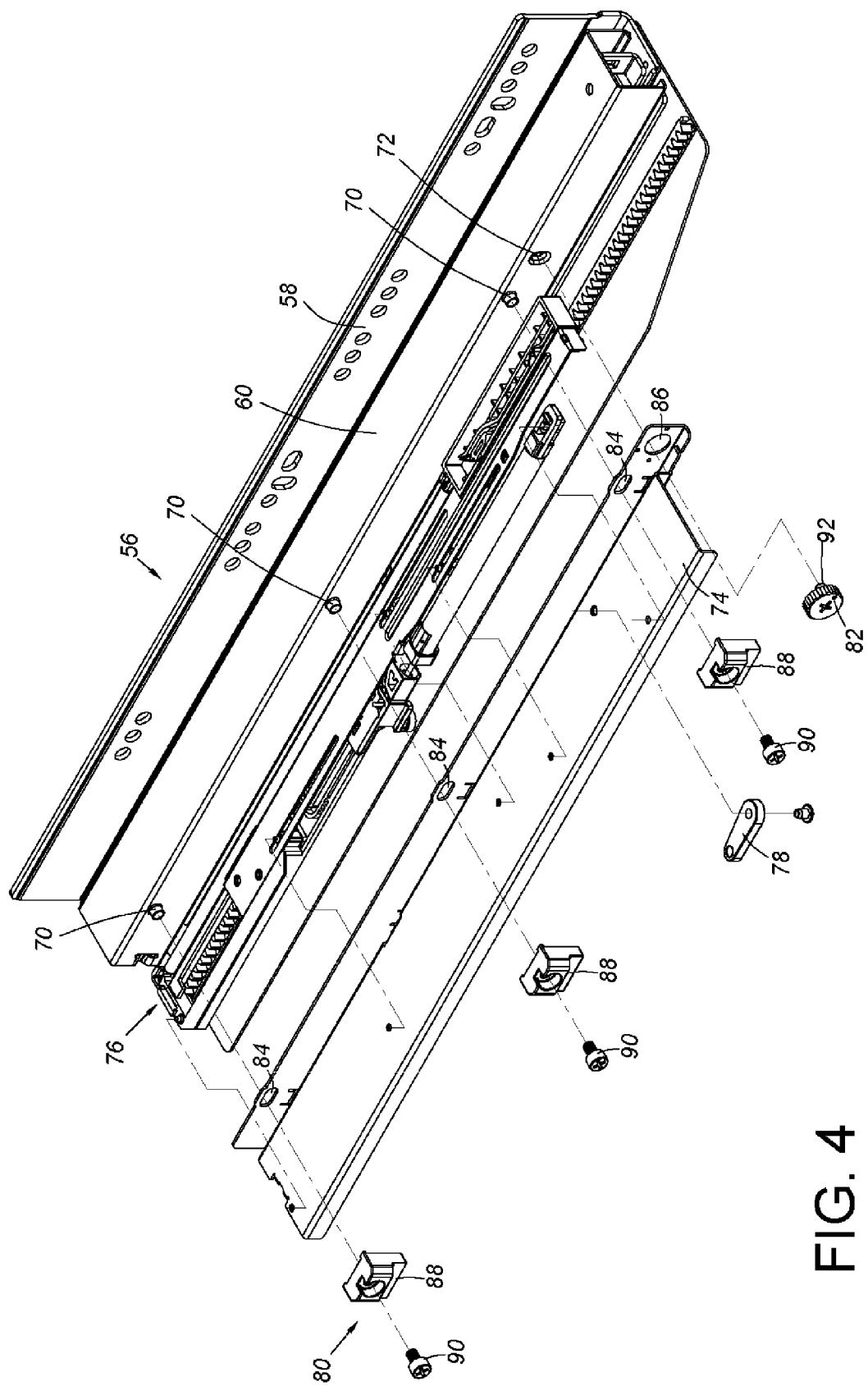
FIG. 4 is an exploded view of the slide rail assembly according to an embodiment of the present invention.

As shown in FIG. 3 and FIG. 4, the second rail 60 of the slide rail assembly 56 comprises a plurality of protruded connection features 70 and an adjusting hole 72 adjacent to a front end of the second rail 60. The slide rail assembly 56 further comprises a carrying member 74, a driving mechanism 76, a swing member 78, a connection assembly 80 and an adjusting member 82. The carrying member 74 is connected to the second rail 60. As such, the carrying member 74 can be seen as a portion of the second rail 60. In the present embodiment, the carrying member 74 has a plurality of connection holes 84 corresponding to the connection features 70 of the second rail 60, and a through holes 86 corresponding to the adjusting hole 72 of the second rail 60. The driving mechanism 76 is configured to facilitate and drive the second rail 60 to move relative to the first rail 58. The swing member 78 is movably connected, such as pivoted to the carrying member 74. The connection assembly 80 comprises a plurality of connection bases 88 and a plurality of fixing members 90. The carrying member 74 is connected to the second rail 60 by the fixing members 90.

As shown in FIG. 5 to FIG. 8, a longitudinal dimension L1 of each connection hole 84 of the carrying member 74 is greater than an outer dimension of each connection feature 70 of the second rail 60, such that the carrying member 74 is longitudinally movable relative to the second rail 60. The adjusting member 82 has an eccentric part 92 deviated from a center position of the adjusting member 82. The eccentric part 92 is correspondingly arranged to pass through the through hole 86 of the carrying member 74 and the adjusting hole 72 of the second rail 60. A longitudinal direction of the adjusting hole 72 is different from a longitudinal direction of the connection hole 84, and a longitudinal dimension L2 of the adjusting hole 72 is greater than an outer dimension of the eccentric part 92 of the adjusting member 82. Through rotating the adjusting member 82 to adjust the carrying member 74, the eccentric part 92 abuts against the second rail 60 in response to rotation of the adjusting member 82, such that the carrying member 74 can be moved relative to the second rail 60 along a longitudinal direction of the second rail 60. Preferably, the carrying member 74 has a protruded stopping feature 94. Through contact between the stopping feature 94 and the adjusting member 82 in a proper tightness, the adjusting member 82 can be more stable after being adjusted.

Figure 9:
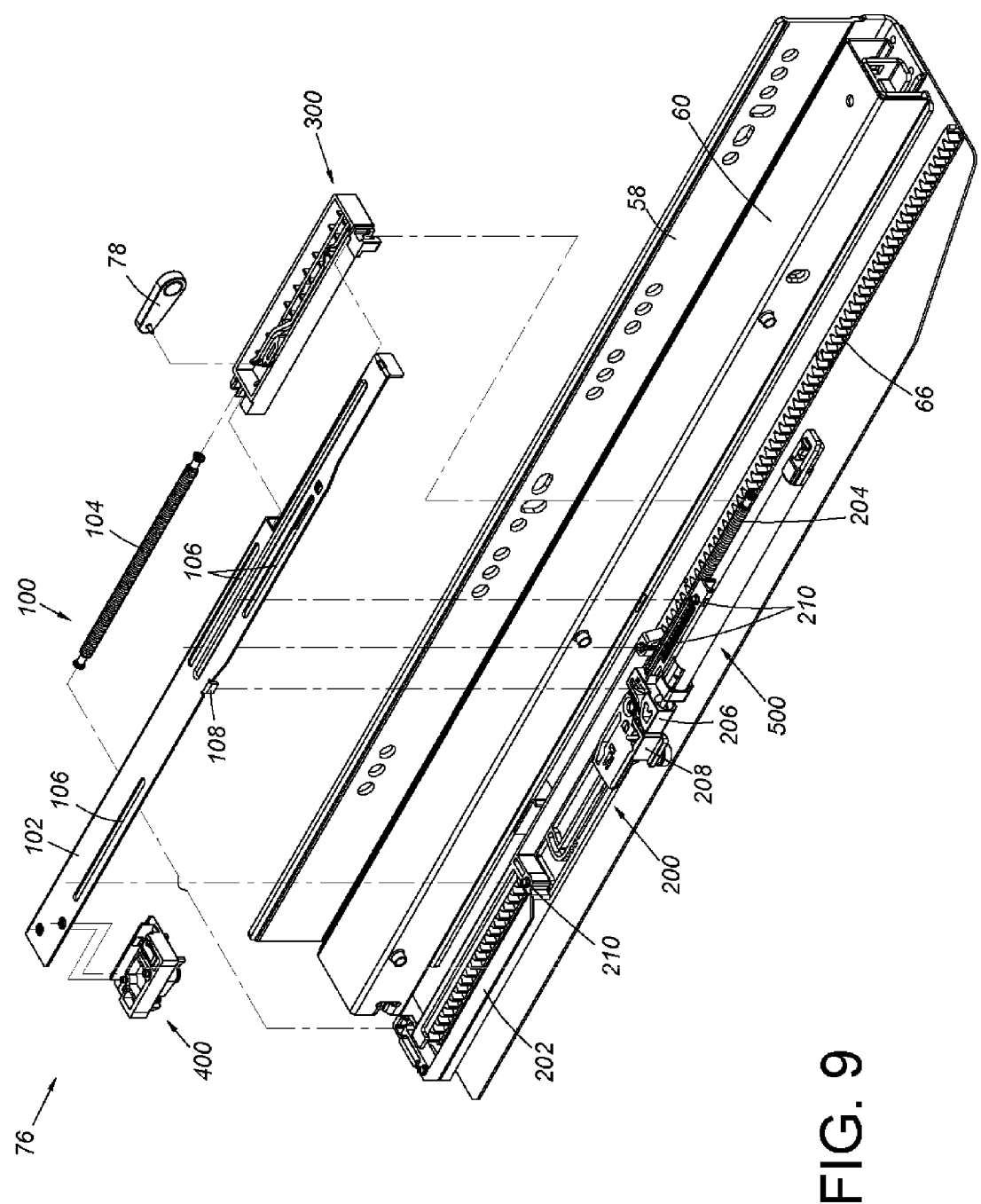
FIG. 9 is an exploded view of the slide rail assembly according to an embodiment of the present invention showing a first driving device, a locking device and a clutch device, wherein the locking device is configured to mount a swing member.

As shown in FIG. 9, the driving mechanism 76 comprises a first driving device 100, a second driving device 200, a locking device 300, a clutch device 400 and a damping member 500. The first driving device 100 is connected to the first rail 58 through the clutch device 400. The first driving device 100 comprises a first base 102 and a first elastic member 104. The first base 102 has a plurality of longitudinal slots 106 and a blocking part 108. The second driving device 200 comprises a second base 202, a second elastic member 204, a blocking member 206 and a capturing member 208. The first base 102 and the second base 202 are longitudinally movable relative to each other. For example, the second base 202 has a plurality of base parts 210. Each of the base parts 210 is arranged within a corresponding longitudinal slot 106, such that the first base 102 and the second base 202 are longitudinally movable relative to each other. The first elastic member 104 is configured to provide an elastic force between the second base 202 of the second driving device 200 and the locking device 300. The blocking part 108 corresponds to the blocking member 206 of the second driving device 200. The second driving device 200 is mounted to the second rail 60. The second base 202 is connected, such as fixedly connected to the carrying member 74 (not shown in FIG. 9) of the second rail 60. The second elastic member 204 is configured to provide an elastic force between the blocking member 206 of the second driving device 200 and the locking device 300. The locking device 300 is connected, such as fixedly connected to the first base 102 of the first driving device 100. As such, the locking device 300 can be seen as a portion of the first base 102. The swing member 78 can be operatively switched between a locking status and an unlocking status by the locking device 300. The clutch device 400 is connected, such as fixedly connected to the first base 102 of the first driving device 100. As such, the clutch device 400 can be seen as a portion of the first base 102. The damping member 500 is configured to damp the blocking member 206 of the second driving device 200.

Figure 10:
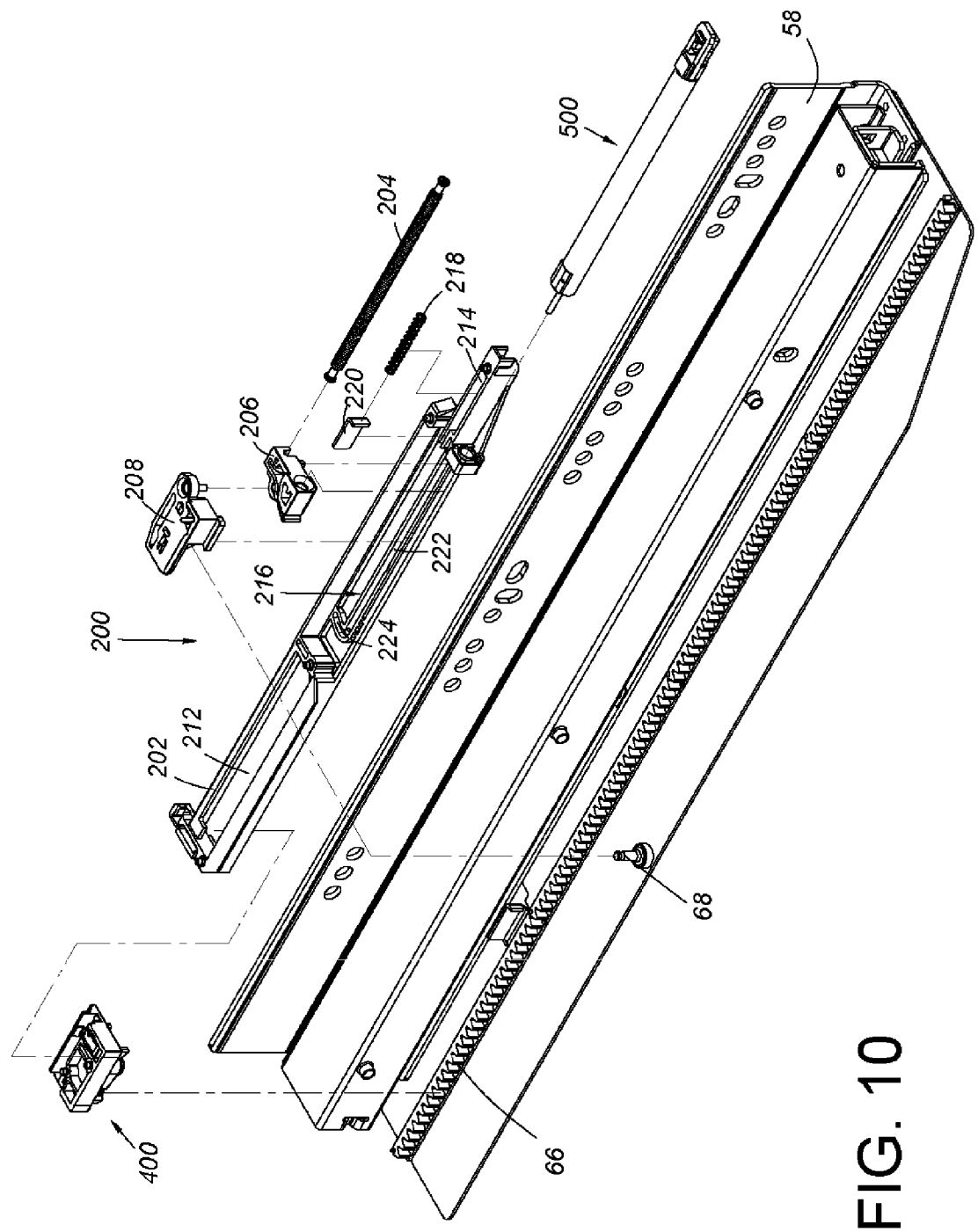
FIG. 10 is an exploded view of the slide rail assembly according to an embodiment of the present invention showing a second driving device, the clutch device and a damping member.

As shown in FIG. 10, a space 212 and a room 214 are formed on the second base 202 of the second driving device 200, and a guiding part 216 is located between the space 212 and the room 214. The clutch device 400 is movably arranged in the space 212 of the second base 202 for moving along the auxiliary track 66. The room 214 is configured to accommodate an auxiliary elastic member 218 and a pushing member 220. The auxiliary elastic member 218 is configured to provide an elastic force to the pushing member 220, such that the pushing member 220 can partially extend out of the room 214 in response to the elastic force of the auxiliary elastic member 218. The guiding part 216 has a first guiding section 222 and a second guiding section 224. The first guiding section 222 has a predetermined length. The second guiding section 224 is turned from the first guiding section 222. The first guiding section 222 and the second guiding section 224 can be two slots or openings communicated with each other. The blocking member 206 of the second driving device 200 is movably connected to the first guiding section 222. The capturing member 208 of the second driving device 200 is pivoted to the blocking member 206, and movably connected to the first guiding section 222. The capturing member 208 is able to move to the second guiding section 224 from the first guiding section 222. The capturing member 208 is configured to capture the engagement feature 68 of the first rail 58.

Figure 11:
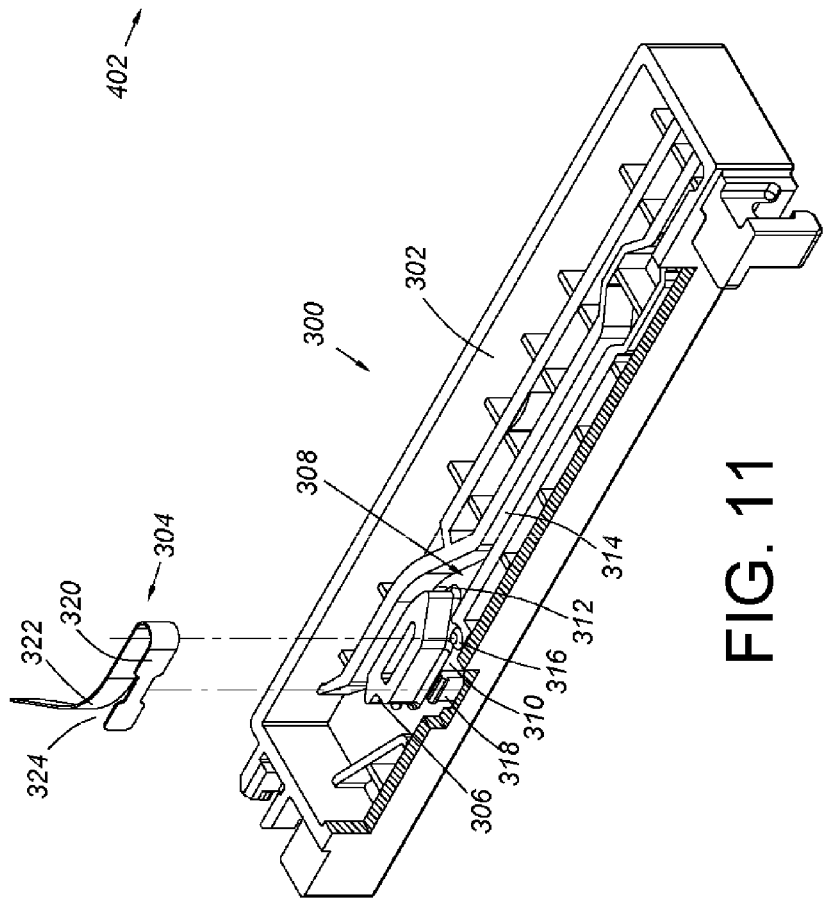
FIG. 11 is an exploded view of the locking device of the slide rail assembly according to an embodiment of the present invention.

As shown in FIG. 11, the locking device 300 comprises a locking base 302 and a guiding member 304. The locking base 302 comprises a locking part 306 and a guiding passage 308. The locking part 306 can be a wall or a recessed structure. The guiding passage 308 passes through the locking part 306. Specifically, the guiding passage 308 comprises a first path 310, a second path 312 communicated with the first path 310, and a third path 314 extended from the first path 310 and the second path 312. The locking part 306 is located between the first path 310 and the second path 312. Preferably, the locking base 302 further comprises a mounting part 316 and an engagement protrusion 318. The guiding member 304 is arranged in the locking base 302. More particularly, the guiding member 304 comprises a first elastic part 320 and a second elastic part 322 extended from the first elastic part 320. The first elastic part 320 and the second elastic part 322 together define an U-shaped mounting space 324, such that the guiding member 304 is mounted to the mounting part 316 and the engagement protrusion 318 through the mounting space 324. A position of the second elastic part 322 substantially corresponds to the locking part 306 of the locking base 302.

Figure 12:
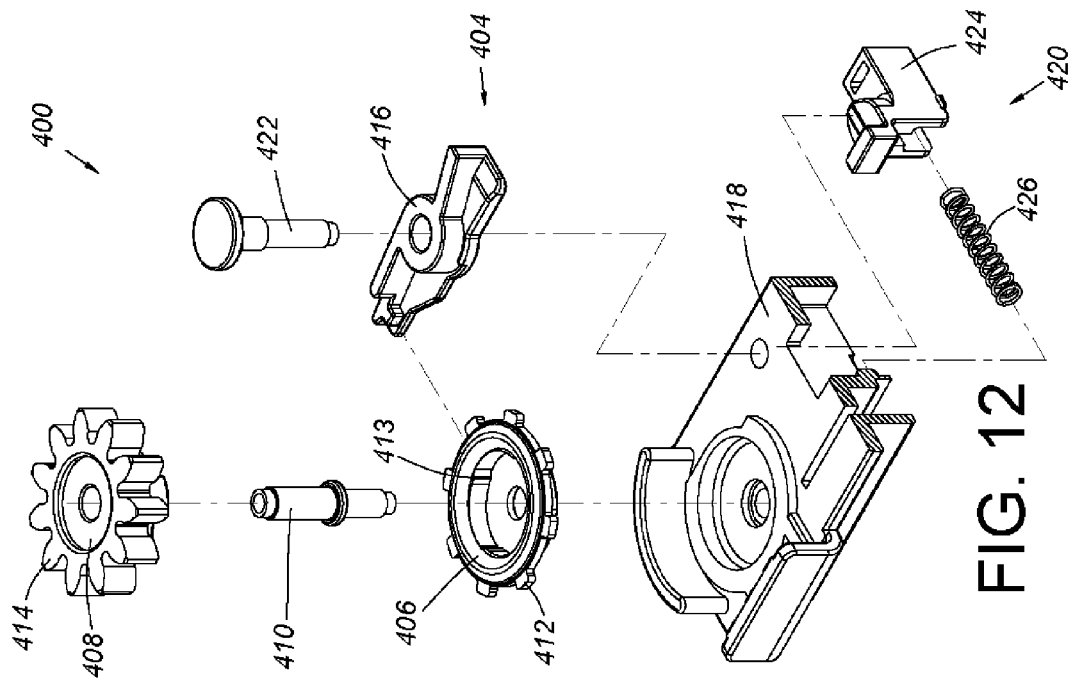
FIG. 12 is an exploded view of the clutch device according to an embodiment of the present invention.

As shown in FIG. 12, the clutch device 400 comprises a clutch 402 and a control mechanism 404 for holding the clutch 402 in a predetermined status. The clutch 402 comprises a first component 406, a second component 408, and a shaft 410 connected to the first component 406 and the second component 408. A plurality of first features 412 are arranged on an outer periphery of the first component 406 at intervals, and a plurality of first abutting parts 413 are arranged on an inner periphery of the first component 406 at intervals. The second component 408 has a plurality of second features 414 separated from each other. The second component 408 can be a gear or a friction wheel corresponding to the auxiliary track 66, and is movable relative to the auxiliary track 66. The control mechanism 404 comprises a control member 416, a mounting base 418 and an elastic device 420. The control member 416 is pivoted to the mounting base 418 through a pivoting member 422. The control member 416 corresponds to the first component 406. The control member 416 is configured to engage with the first component 406 in response to an elastic force generated by the elastic device 420. The first component 406 and the second component 408 are pivoted to the mounting base 418 by the shaft 410. The elastic device 420 is mounted to the mounting base 418. The elastic device 420 comprises a contact member 424 and a spring 426 configured to provide an elastic force to the contact member 424 for elastically driving the control member 416.

As shown in FIG. 13 and FIG. 14, the control member 416 engages with the first feature 412 of the first component 406 of the clutch 402 in response to the elastic force generated by the elastic device 420.

As shown in FIG. 15, the clutch 402 further comprises a plurality of abutting members 428 movably mounted between the first component 406 and the second component 408. The abutting members 428 can be balls or rollers. In addition, the second component 408 comprises a plurality of second abutting parts 415.

Figure 16:
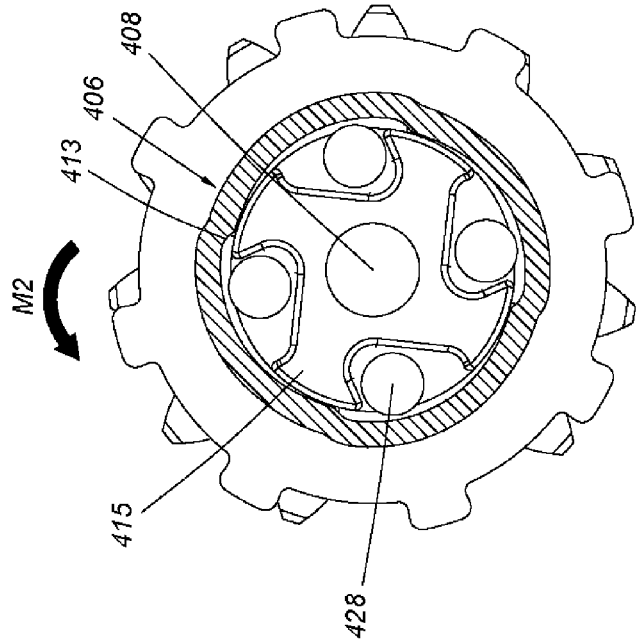
FIG. 16 is a diagram showing two components abutting against each other when an abutting member of the clutch device is located at a predetermined position according to an embodiment of the present invention.
Figure 17:
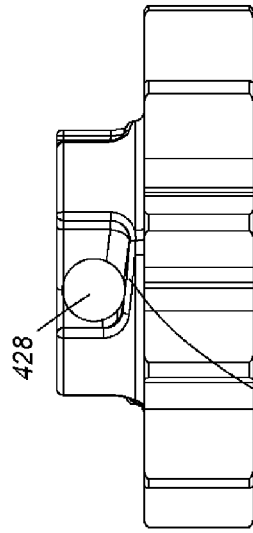
FIG. 17 is a diagram showing the abutting member of FIG. 16 in another angle.

As shown in FIG. 16 and FIG. 17, at least one abutting structure is arranged between the first component 406 and the second component 408, and a bounded path 438 is adjacent to the abutting structure. The first component 406 is arranged with at least one first abutting part 413. The first abutting part 413 and the second abutting part 415 together form a abutting structure. An abutting space 432 is defined between the first abutting part 413 of the first component 406 and the second abutting part 415 of the second component 408. The abutting member 428 is correspondingly abutted in the abutting space 432. Preferably, the path 438 is arranged on the second component 408 and adjacent to the second abutting part 415. The path 438 has an inclined face, and the abutting member 428 is movable on the path 438. When the second component 408 is moved along a first moving direction M1, the abutting member is moved to a predetermined position on the path 438 to abut against the first abutting part 413 of the first component 406 and the second abutting part 415 of the second component 408, such that the second component 408 can drive the first component 406 to move along the first moving direction M1 through the abutting member 428.

Figure 18:
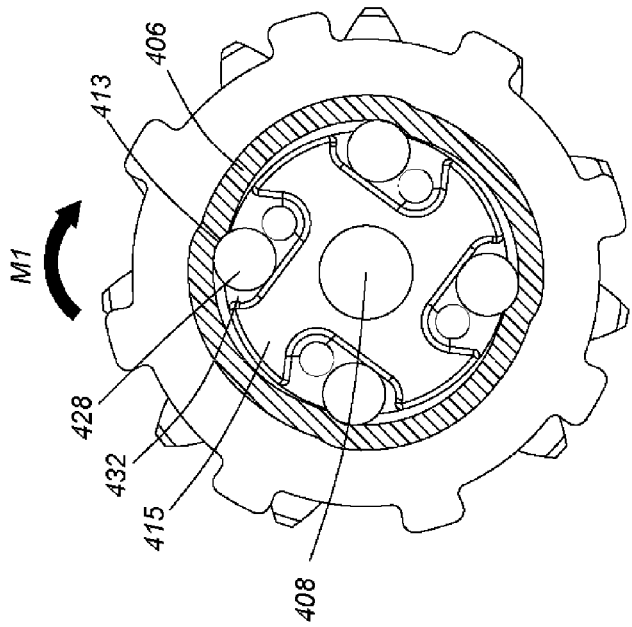
FIG. 18 is a diagram showing the abutting member of the clutch device away from the predetermined position according to an embodiment of the present invention.
Figure 19:
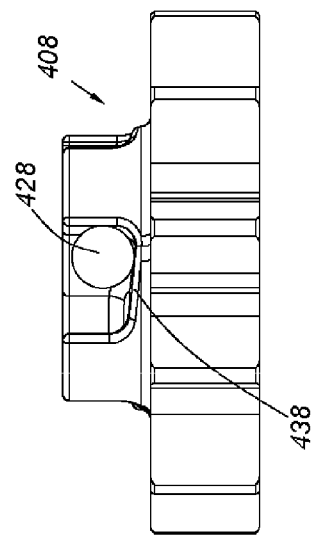
FIG. 19 is a diagram showing the abutting member of FIG. 18 in another angle.

As shown in FIG. 18 and FIG. 19, when the second component 408 is moved along a second moving direction M2, the abutting member 428 is driven by the second abutting part 415 of the second component 408 to move, such that the abutting member 428 is apart from the predetermined position of the path 438. Thus the second component 408 is not able to drive the first component 406 to move along the second moving direction M2 through the abutting member 428.

As shown in FIG. 20, the second rail 60 is located at a retrieve position P1 relative to the first rail 58. Meanwhile, the swing member 78 abuts against the locking part 306 of the locking device 300, and the first elastic member 104 of the first driving device 100 accumulates a first driving force F1 due to the swing member 78 abutting against the locking part 306. Under such status, the second elastic part 322 of the guiding member 304 elastically abuts against the swing member 78. On the other hand, the capturing member 208 has a capturing feature 226 for capturing the engagement feature 68 of the first rail 58. The capturing feature 226 can be a clasp or recessed structure. In addition, the pushing member 220 is configured to contact the blocking member 206 in response to the elastic force generated by the auxiliary elastic member 218. The blocking part 108 of the first base 102 of the first driving device 100 abuts against the blocking member 206 of the second driving device 200, and the blocking part 108 of the first base 102 of the first driving device 100 corresponds to a notch 228 of the second base 202 of the second driving device 200. The damping member 500 comprises a damping rod 502 for abutting against the blocking member 206.

As shown in FIG. 21, since the capturing member 208 is engaged with the engagement feature 68 of the first rail 58, the second rail 60 is moved from the retrieve position P1 along a first direction D1 relative to the first rail 58 when an external force is applied to the second rail 60 along the first direction D1. The pushing member 220 abuts against the blocking member 206 in response to the external force, and further presses the auxiliary elastic member 218, such that the second rail 60 is moved a short distance from the retrieve position P1 along the first direction D1 relative to the first rail 58. Meanwhile, the notch 228 of the second base 202 of the second driving device 200 is moved relative to the blocking part 108, such that the blocking part 108 extends into the notch 228. On the other hand, the swing member 78 is moved with the second rail 60 along the first direction D1 for pushing the guiding member 304 to disengage from the locking part 306 to be switched to the unlocking status.

Figure 22:
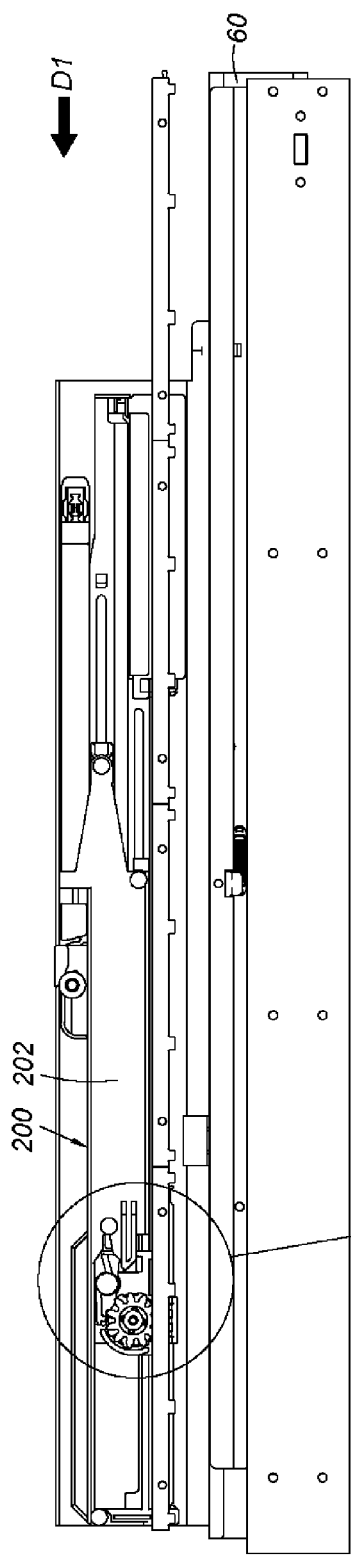
FIG. 22 is a diagram showing a status of the clutch device when the second rail of the slide rail assembly is moved from the retrieve position along the first direction relative to the first rail according to an embodiment of the present invention.
Figure 23:
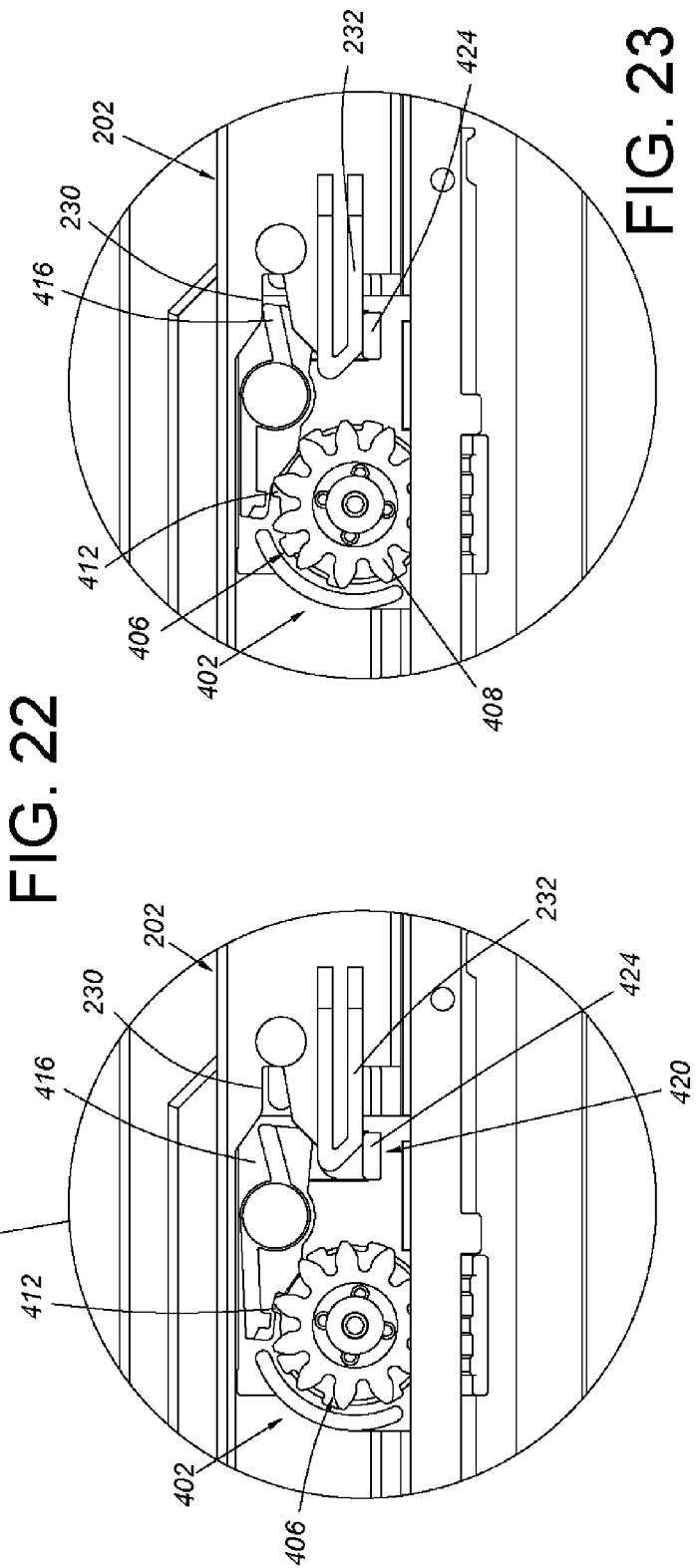
FIG. 23 is a diagram showing a second base of the second driving device of the slide rail assembly releasing the clutch device.

As shown in FIG. 22 and FIG. 23, the second base 202 of the second driving device 200 is arranged with a releasing feature, such as a first pushing part 230 corresponding to the control member 416 of the clutch 402. When the second rail 60 is moved along the first direction D1, the control member 416 is pushed by the first pushing part 230 to disengage from the first feature 412 of the first component 406 of the clutch 402. Meanwhile, the second component 408 of the clutch 402 is free to rotate. On the other hand, the second base 202 of the second driving device 200 further comprises a second pushing part 232 corresponding to the contact member 424 of the elastic device 420 of the clutch 402, for pushing the contact member 424, so as to stop the elastic device 420 from applying the elastic force to the control member 416.

As shown in FIG. 24 and FIG. 25, when the swing member 78 is disengaged from the locking part 306 of the locking device 300, the second elastic part 322 of the guiding member 304 can elastically guide the swing member 78 to move to the second path 312 of the guiding passage 308. The first elastic member 104 of the first driving device 100 then releases the first driving force F1, such that the second rail 60 is moved from the retrieve position P1 along a second direction D2 relative to the first rail 58. More particularly, after the first elastic member 104 of the first driving device 100 releasing the first driving force F1, the second base 202 of the second driving device 200 is further moved with the second rail 60 along the second direction D2 relative to the first rail 58. In the process of the first elastic member 104 releasing the elastic force, the swing member 78 is moved from the second path 312 of the guiding passage 308 toward the third path 314. On the other hand, when the second base 202 of the second driving device 200 is moved along the second direction D2, the guiding part 216 of the second driving device 200 is moved relative to the capturing member 208. In addition, the damping rod 502 of the damping member 500 extends to be in a damping ready status and corresponds to the blocking member 206 of the second driving device 200. As mention above, the swing member 78 can be operatively engaged between the locking part 306 and the guiding member 304, for allowing the first elastic member 104 of the first driving device 100 to accumulate the first driving force F1; and the swing member 78 can also be operatively disengaged from the locking part 306 and the guiding member 304, for releasing the first driving force F1, so as to drive the second furniture part 54 to move from a close position to an open position.

As shown in FIG. 26, when the second base 202 of the second driving device 200 is moved along the second direction D2, the first pushing part 230 no longer pushes the control member 416 of the clutch 402, and the second pushing part 232 of the second base 202 no longer abuts against the contact member 424 of the elastic device 420 of the clutch 402, such that the contact member 424 abuts against the control member 416, and the control member 416 is held to engage with the first feature 412 of the first component 406 of the clutch 402 in response to the elastic force of the elastic device 420. Meanwhile, rotation of the second component 408 of the clutch 402 is limited, such that the clutch device 400 is only movable along the second direction D2.

As shown in FIG. 27, when the second base 202 of the second driving device 200 is moved further along the second direction D2, through guiding of the second guiding section 224 of the guiding part 216 of the second base 202, a guiding pin 234 of the capturing member 208 is moved to the second guiding section 224 of the guiding part 216, such that the capturing member 208 is deflected, and the capturing feature 226 of the capturing member 208 is disengaged from the engagement feature 68 of the extension base 64.

As shown in FIG. 28, after the second rail 60 is driven to move relative to the first rail 58, an user can further pull out the second rail 60 along the second direction D2 if the second rail 60 is not fully expanded relative to the first rail 58.

As shown in FIG. 29 and FIG. 30, the clutch device 400 is configured to temporarily block the first driving device 100 in an early process of the second rail 60 moving from an open position P2 to the retrieve position P1 relative to the first rail 58. When an external force is applied to the second rail 60 to move the second rail 60 from the open position P2 along the first direction D1, the second base 202 of the second driving device 200 is moved relative to the first rail 58 in response to the external force. The first elastic member 104 of the first driving device 100 then accumulates a first elastic force in response to the external force, and the second elastic member 204 of the second driving device 200 also accumulates a second elastic force in response to the external force. When the external force is not big enough to move the swing member 78 to engage with the locking part 306 of the locking device 300, the first elastic force and the second elastic force are released once the external force is no longer applied to the second rail 60. Thus the second rail 60 is ejected outward relative to the first rail 58. On the other hand, since the clutch device 400 is in an engaging status, the clutch device 400 can only move along the second direction D2 relative to the auxiliary track 66. Therefore, a resistance force is provided to the first base 102 from the clutch device 400, so as to block the first base 102 of the first driving device 100 from moving along the first direction D1. When the second base 202 of the second driving device 200 is moved relative to the first rail 58 in response to the external force, the first elastic member 104 is stretched by the second base 202 to accumulate an elastic force, and the second elastic member 204 is also stretched by the second base 202 to accumulate an elastic force due to the guiding pin 234 of the capturing member 208 abutting against the second guiding section 224. The swing member 78 then is moved from the third path 314 to the first path 310 relative to the locking device 300. On the other hand, the second pushing part 232 of the second base 202 is moved to push the contact member 424 of the clutch device 400, for moving the contact member 424 a distance S.

Figure 31:
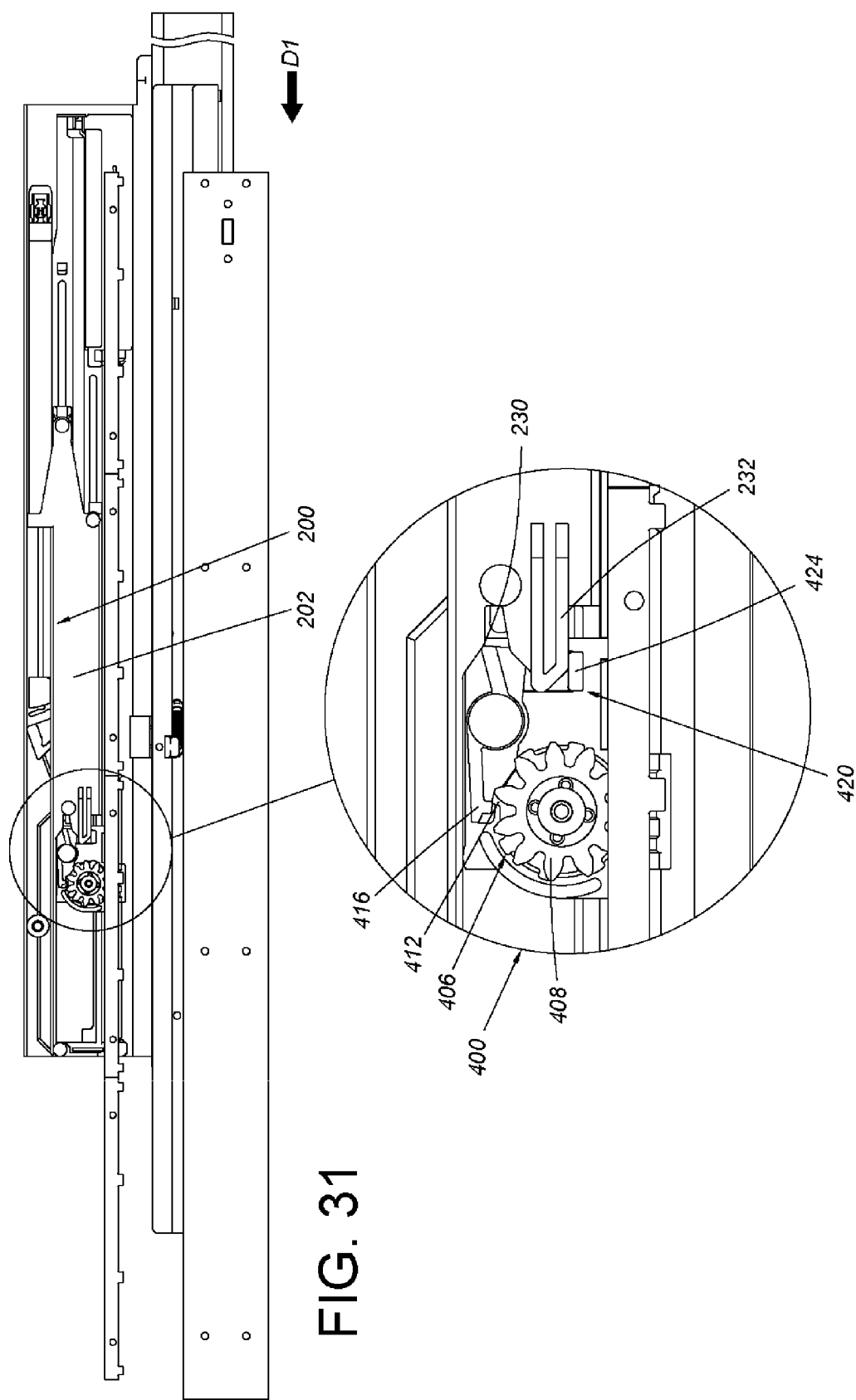
FIG. 31 is a diagram showing a status of the clutch device when the second rail of the slide rail assembly is moved from the open position along the first direction relative to the first rail according to an embodiment of the present invention, for illustrating the clutch device being released to stop blocking.

As shown in FIG. 31, the second base 202 of the second driving device 200 is further moved along the first direction D1. The second pushing part 232 of the second base 202 pushes the contact member 424 of the clutch device 400, such that the control member 416 is not affected by the elastic force of the elastic device 420. On the other hand, the control member 416 is pushed by the first pushing part 230 of the second base 202 to deflect, such that the control member 416 is disengaged from the first feature 412 of the first component 406. Meanwhile, the clutch device 400 stops providing the resistance force to the first base 102, and the clutch device 400 is in a free status.

As shown in FIG. 32 and FIG. 33 following the status in FIG. 31, when the second rail 60 is moved relative to the first rail 58 to be retrieved, the capturing member 208 of the second driving device 200 is going to capture the engagement feature 68 of the first rail 58, and the swing member 78 is moved from the first path 310 to abut against the locking part 306 through guiding of the second elastic part 322 of the guiding member 304. Meanwhile, the first elastic member 104 of the first driving device 100 and the second elastic member 204 of the second driving device 200 respectively accumulate the first driving force F1 and a second driving force F2 along the first direction D1.

As shown in FIG. 34 and FIG. 35, in an end process of the second rail 60 moving from the open position to the retrieve position P1 relative to the first rail 58, the second rail 60 is further moved relative to the first rail 58 along the first direction D1 to be completely retrieved, and the capturing feature 226 of the capturing member 208 then captures the engagement feature 68 of the first rail 58. Thus the guiding pin 234 of the capturing member 208 is moved from the second guiding section 224 to the first guiding section 222, such that the second elastic member 204 of the second driving device 200 releases the second driving force F2, for retrieving the second rail 60 along the first direction D1 relative to the first rail 58 by the second driving force F2. In addition, since the damping rod 502 of the damping member 500 abuts against the blocking member 206, the damping member 500 is configured to provide damping effect in the process of retrieving the second rail 60 to the retrieve position P1 relative to the first rail 58.

FIG. 36 and FIG. 37 illustrate another operation mode of the present invention. In a status of the clutch device 400 being blocked on the auxiliary track 66 along the first direction D1, when the second rail 60 is moved from the open position P2 along the first direction D1 relative to the first rail 58 by an external force, and the external force along the first direction D1 is not big enough to move the swing member 78 in the guiding passage 308 to engage with the locking part 306, the elastic forces accumulated by the first elastic member 104 and the second elastic member 204 are released once the external force is no longer applied to the second rail 60, such that the second rail 60 is ejected along the second direction D2 relative to the first rail 58.

Figure 38:
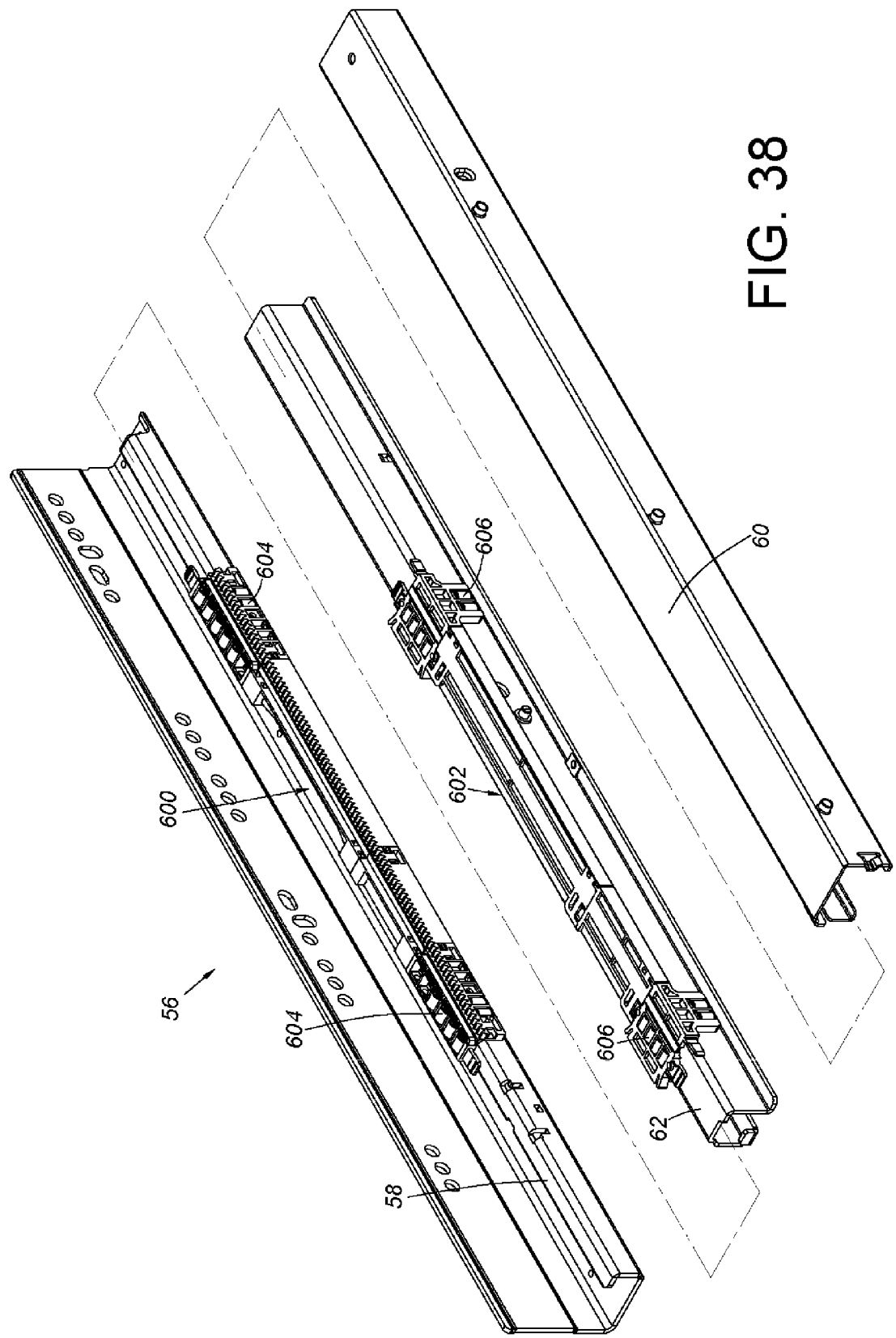
FIG. 38 is an exploded view of the slide rail assembly according to an embodiment of the present invention.

As shown in FIG. 38, the side rail assembly 56 comprises a first sliding auxiliary device 600 and a second sliding auxiliary device 602. The first sliding auxiliary device 600 is movably arranged between the first rail 58 and the third rail 62. The first sliding auxiliary device 600 comprises at least one first rolling member 604 for facilitating the third rail 62 to move relative to the first rail 58. The second sliding auxiliary device 602 is movably arranged between the third rail 62 and the second rail 60. The second sliding auxiliary device 602 comprises at least one second rolling member 606 for facilitating the second rail 602 to move relative to the third rail 62.

Figure 40:
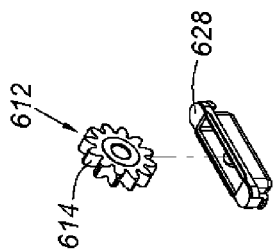
FIG. 40 is an exploded view of the synchronizing member and a pivotal base of FIG. 39.
Figure 39:
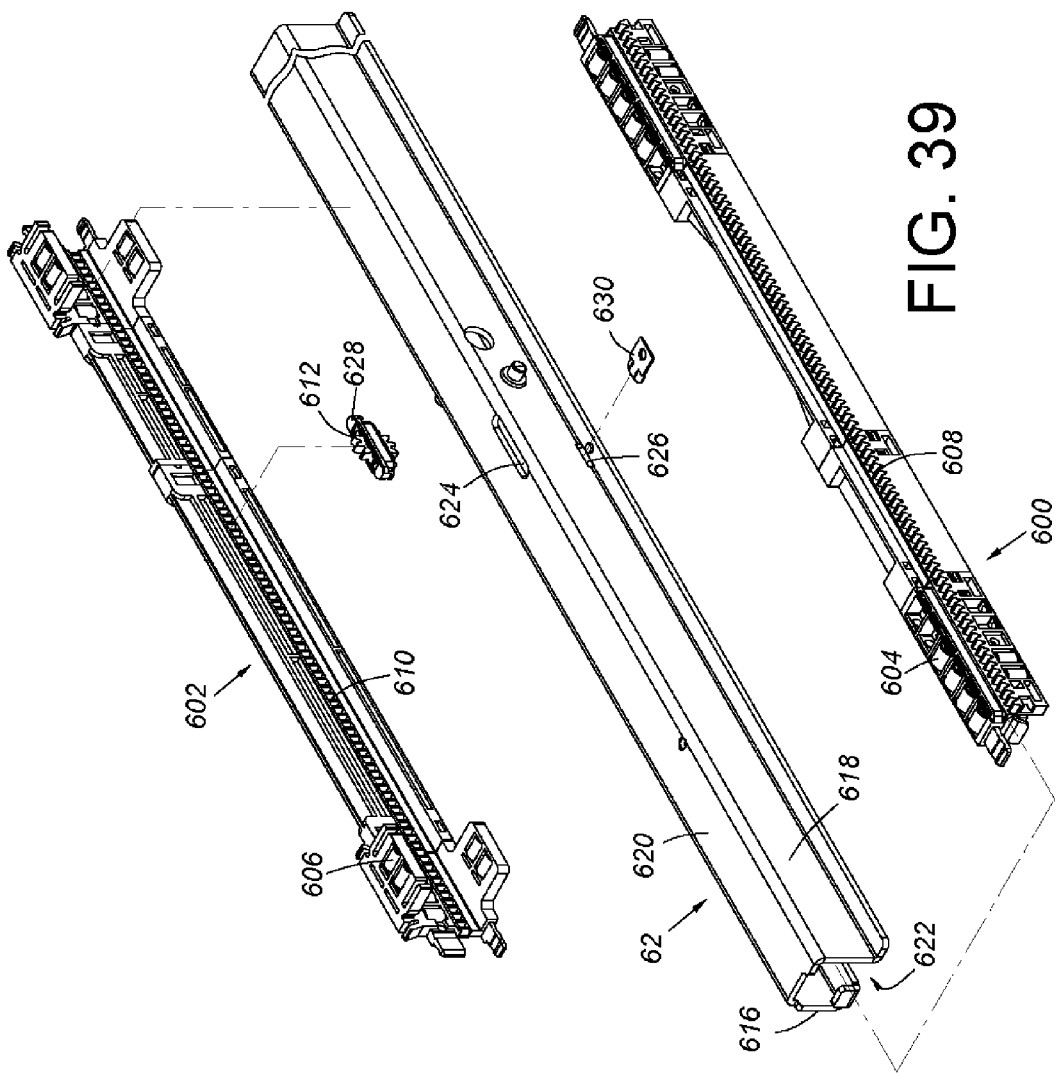
FIG. 39 is an exploded view of the slide rail assembly comprising a synchronizing member arranged between two sliding auxiliary devices of the slide rail assembly, and a support member configured to be mounted to a third rail for supporting one of the sliding auxiliary devices.

As shown in FIG. 39 and FIG. 40, the first sliding auxiliary device 600 further comprises a first meshing feature 608 adjacent to the at least one first rolling member 604, and the second sliding auxiliary device 602 further comprises a second meshing feature 610 adjacent to the at least one second rolling member 606. The slide rail assembly further comprises a synchronizing member 612 mounted to the third rail 62. The synchronizing member 612 comprises a third meshing feature 614 configured to mesh between the first meshing feature 608 and the second meshing feature 610. The first meshing feature 608 and the second meshing feature 610 can be gear racks. The third meshing feature 614 can be a gear. Specifically, the third rail 62 comprises a first side wall 616, a second side wall 618 and a longitudinal wall 620 connected between the first side wall 616 and the second side wall 618. The first side wall 616, the second side wall 618 and the longitudinal wall 620 together define a rail space 622 for accommodating the first sliding auxiliary device 600 and the first rail 58 (not shown in FIG. 39 and FIG. 40). Preferably, the third rail 62 has a first mounting hole 624 and a second mounting hole 626 communicated with the rail space 622. The synchronizing member 612 is mounted into the first mounting hole 624 of the third rail 62 by a pivotal base 628. In the present embodiment, the slide rail assembly 56 further comprises a support member 630 mounted into the second mounting hole 626 of the third rail 62 and extended into the rail space 622.

As shown in FIG. 41, through the synchronizing member 612 meshing between the first meshing feature 608 of the first sliding auxiliary device 600 and the second meshing feature 610 of the second sliding auxiliary device 602, the first sliding auxiliary device 600 and the second sliding auxiliary device 602 of the slide rail assembly 56 can synchronously move relative to each other. On the other hand, the support member 630 is configured to support a bottom of the adjacent first sliding auxiliary device 600, so as to prevent the first sliding auxiliary device 600 from being deformed by an external weight (such as a weight of a carried object on the slide rail assembly 56), such that the synchronizing member 612 can stably mesh between the first meshing feature 608 and the second meshing feature 610.

Figure 42:
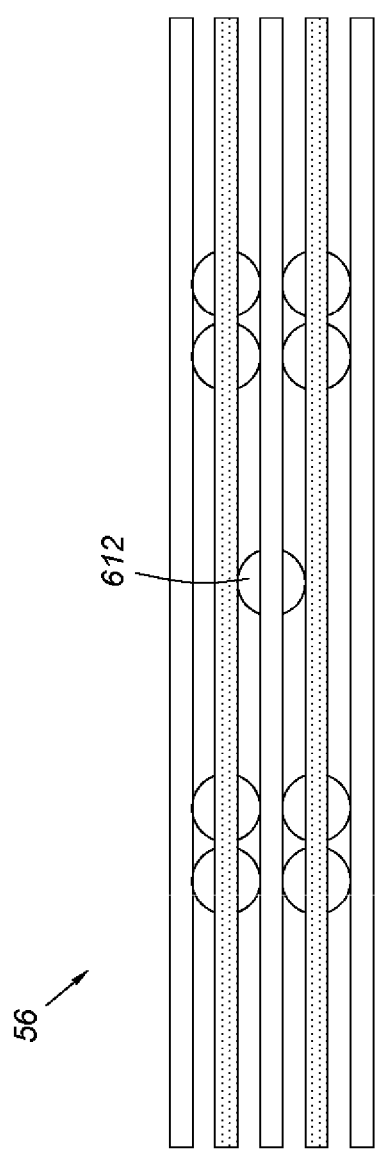
FIG. 42 is a diagram showing the slide rail assembly comprising the synchronizing member arranged between the two sliding auxiliary devices.
Figure 43:
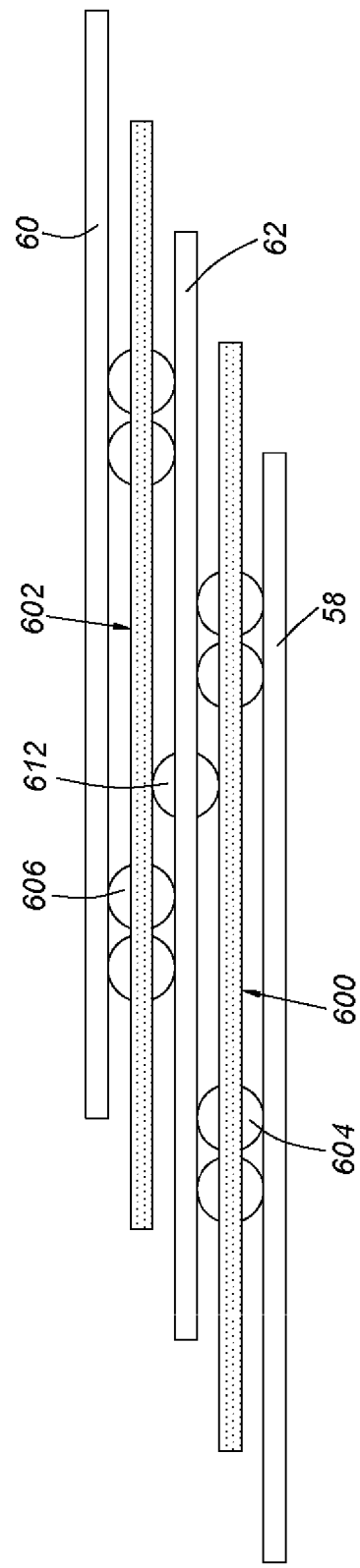
FIG. 43 is a diagram showing the two sliding auxiliary devices synchronously moving relative to each other through the synchronizing member.

As shown in FIG. 42 and FIG. 43, through the synchronizing member 612 meshing between the first sliding auxiliary device 600 and the second sliding auxiliary device 602, the first sliding auxiliary device 600 and the second sliding auxiliary device 602 of the slide rail assembly 56 can synchronously move relative to each other, in order to improve stability of the slide rail assembly 56 when the second rail 60 and the third rail 62 are moved relative to the first rail 58.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A slide rail assembly, comprising:
a first rail;
a second rail movable relative to the first rail;
a third rail mounted between the first rail and the second rail;

a first sliding auxiliary device movably arranged between the first rail and the third rail, the first sliding auxiliary device comprising at least one first rolling member and a first meshing feature, the least one first rolling member configured to facilitate the third rail to move relative to the first rail;

a second sliding auxiliary device movably arranged between the third rail and the second rail, the second sliding auxiliary device comprising at least one second rolling member and a second meshing feature, the least one second rolling member configured to facilitate the second rail to move relative to the third rail; and a synchronizing member meshed between the first meshing feature and the second meshing feature;

wherein the slide rail assembly further comprises a first driving device, a locking device and a swing member, the first driving device comprises a first elastic member, the locking device comprises a locking part and a guiding member, the guiding member is configured to generate a force toward the locking part, the swing member is movably connected to the second rail; when the swing member is operatively engaged between the locking part and the guiding member, the first elastic member of the first driving device accumulates a first driving force; and when the swing member is operatively disengaged from the locking part and the guiding member, the first driving force is released to drive the second rail to move from a retrieve position to an open position relative to the first rail.

2. The slide rail assembly of claim 1, further comprising a support member configured to support the first sliding auxiliary device.

3. The slide rail assembly of claim 1, wherein the locking device has a guiding passage passing through the locking part, the swing member is movable in the guiding passage.

4. The slide rail assembly of claim 1, wherein the first driving device is mounted to the first rail, the first driving device comprises a first base connected to the locking device, the driving mechanism further comprises a second driving device, the second driving device comprises a second base movably connected to the first base.

5. The slide rail assembly of claim 4, wherein the second base is connected to the second rail.

6. The slide rail assembly of claim 4, wherein the first furniture part comprises an engagement feature, the second driving device further comprises a capturing member and a blocking part pivoted to the capturing member, the capturing member and the blocking part are movably connected to the second base, the capturing member is configured to capture the engagement feature.

7. The slide rail assembly of claim 6, wherein the second base comprises a first guiding section and a second guiding section communicated with the first guiding section and turned from the first guiding section, the capturing member and the blocking part are movable in the first guiding section.

8. The slide rail assembly of claim 6, wherein the first base of the first driving device comprises a blocking part configured to abut against the blocking member.

9. The slide rail assembly of claim 8, wherein the second base of the second driving device has a notch for allowing the blocking part to extend into the notch.

10. The slide rail assembly of claim 6, wherein the second base comprises a room for accommodating an auxiliary elastic member and a pushing member, the pushing member is configured to abut against the blocking member to press the auxiliary elastic member, for allowing the second rail to move a distance relative to the first rail.

11. The slide rail assembly of claim 6, wherein the second driving device further comprises a second elastic member, the slide rail assembly further comprises a clutch device connected to the first base of the first driving device, the clutch device is configured to temporarily block the first driving device in an early process of the second rail moving from the open position to the retrieve position relative to the first rail, such that the second elastic member accumulates a second driving force in response to movement of the second rail, the second driving force is configured to drive the second rail to move to the retrieve position to be retrieved in an end process of the second rail moving from the open position to the retrieve position relative to the first rail.

12. The slide rail assembly of claim 6, further comprising a damping member configured to damp the blocking member of the second driving device.

13. A slide rail assembly, comprising:
a first rail comprising an engagement feature;
a second rail movable relative to the first rail;
a third rail mounted between the first rail and the second rail;
a first sliding auxiliary device movably arranged between the first rail and the third rail, the first sliding auxiliary device comprising at least one first rolling member and a first meshing feature, the least one first rolling member configured to facilitate the third rail to move relative to the first rail;
a second sliding auxiliary device movably arranged between the third rail and the second rail, the second sliding auxiliary device comprising at least one second rolling member and a second meshing feature, the least one second rolling member configured to facilitate the second rail to move relative to the third rail;
a synchronizing member meshed between the first meshing feature and the second meshing feature;
a first driving device comprising a first base and a first elastic member;
a locking device connected to the first base of the first driving device, the locking device comprising a locking part;
a swing member movably connected to the second rail, wherein the first elastic member of the first driving device is configured to accumulate a first driving force in response to the swing member abutting against the locking part of the locking device, the first driving force is configured to drive the second furniture part to move from a retrieve position to an open position relative to the first furniture part;
a second driving device mounted to the second rail, the second driving device comprising a second base, a capturing member and a second elastic member, wherein the capturing member is movably connected to the second base for capturing the engagement feature of the first rail; and
a clutch device mounted between the first rail and the first base of the first driving device;
wherein the clutch device is configured to block the first driving device along a predetermined direction, when the second rail is moved from the open position to the retrieve position, the swing member abuts against the locking part of the locking device and the second elastic member accumulates a second driving force, the second driving force is configured to drive the second rail to be retrieved relative to the first furniture part.

14. The slide rail assembly of claim 13, wherein the first rail further comprises an auxiliary track, the clutch device comprises a first component, a second component and an abutting member, the second component is movably connected to the first component and is movable along the auxiliary track, one of the first component and the second component has at least one abutting structure, a path is adjacent to the at least one abutting structure, the abutting member is movable on the path, when the second component is moved along a first moving direction relative to the first component, the abutting member is moved to a predetermined position on the path to abut against the first component and the second component, such that the first component is driven by the second component to move along the first moving direction.

15. The slide rail assembly of claim 14, wherein the clutch device further comprises a mounting base, a control member and a spring, the first component and the second component are mounted to the mounting base by a shaft, the control member is movably connected to the mounting base, the spring is mounted to the mounting base and configured to provide an elastic force for driving the control member, when the control member is engaged with the first component, the first driving device is blocked by the clutch device along the predetermined direction relative to the first furniture part, the path has an inclined face.

16. The slide rail assembly of claim 15, wherein the clutch device further comprises a contact member mounted to the mounting base, the spring is configured to elastically drive the control member through the contact member, the second base of the second driving device has at least one pushing part configured to push the contact member for removing the engaging status of the clutch device.

17. A slide rail assembly, comprising:
a first rail;
a second rail movable relative to the first rail;
a third rail mounted between the first rail and the second rail;
a first sliding auxiliary device movably arranged between the first rail and the third rail, the first sliding auxiliary device comprising at least one first rolling member and a first meshing feature, the least one first rolling member configured to facilitate the third rail to move relative to the first rail;
a second sliding auxiliary device movably arranged between the third rail and the second rail, the second sliding auxiliary device comprising at least one second rolling member and a second meshing feature, the least one second rolling member configured to facilitate the second rail to move relative to the third rail;
a synchronizing member meshed between the first meshing feature and the second meshing feature;
a first driving device comprising a first elastic member;
a locking device connected to the first driving device, the locking device comprising a locking part, a guiding passage passing through the locking part, and a guiding member configured to generate a force toward the locking part; and
a swing member movably connected to the second rail, and configured to move to abut against the locking part through the guiding passage;
wherein the first elastic member of the first driving device is configured to accumulate a first driving force in response to the swing member abutting against the locking part;
wherein when the swing member is disengaged from the locking part, the swing member is guided to the guiding passage by the guiding member of the locking device, and the first elastic member releases the first driving force to drive the second rail to move from a retrieve position to an open position relative to the first rail.

18. The slide rail assembly of claim 17, wherein the first driving device further comprises a first base, the slide rail assembly further comprises a second driving device mounted to the second rail, the second driving device comprises a second base movably connected to the first base, and connected to the second rail, the first rail comprises an engagement feature, the second driving device further comprises a capturing member and a blocking part pivoted to the capturing member, the capturing member and the blocking part are movably connected to the second base, the capturing member is configured to capture the engagement feature.

19. The slide rail assembly of claim 18, wherein the second driving device further comprises a second elastic member, the slide rail assembly further comprises a clutch device connected to the first base of the first driving device, the clutch device is configured to temporarily block the first driving device in an early process of the second rail moving from the open position to the retrieve position relative to the first rail, such that the second elastic member accumulates a second driving force in response to movement of the second rail, the second driving force is configured to drive the second rail to be retrieved in an end process of the second rail moving from the open position to the retrieve position relative to the first rail.

* * * * *